(12) United States Patent
Agarwal

(10) Patent No.: US 11,899,809 B2
(45) Date of Patent: Feb. 13, 2024

(54) PROOF-OF-APPROVAL DISTRIBUTED LEDGER

(71) Applicant: Vinay Kumar Agarwal, Cupertino, CA (US)

(72) Inventor: Vinay Kumar Agarwal, Cupertino, CA (US)

(73) Assignee: Vinay Kumar Agarwal, Cupertino, CA (US)

( * ) Notice: Subject to any disclaimer, the term of this patent is extended or adjusted under 35 U.S.C. 154(b) by 0 days.

(21) Appl. No.: 18/098,593

(22) Filed: Jan. 18, 2023

(65) Prior Publication Data

US 2023/0153453 A1 May 18, 2023

Related U.S. Application Data

(63) Continuation of application No. 16/248,644, filed on Jan. 15, 2019, now Pat. No. 11,580,238.

(Continued)

(51) Int. Cl.
*H04L 9/32* (2006.01)
*H04L 9/40* (2022.01)
(Continued)

(52) U.S. Cl.
CPC ........ *G06F 21/6218* (2013.01); *H04L 9/3236* (2013.01); *H04L 9/3239* (2013.01);
(Continued)

(58) Field of Classification Search
CPC .... G06F 21/6218; G06F 16/182; G06F 21/64; G06F 16/27; H04L 9/3236; H04L 9/3239; H04L 9/3247; H04L 9/50; H04L 63/1441; H04L 2209/56; H04L 2209/38; H04L 9/0637; H04L 9/0643; H04L 9/3297; H04L 63/12; H04L 63/123; H04L 9/3242; H04L 9/3249; H04L 9/3252; H04L 9/3255; H04L 9/3257; G06Q 20/065
See application file for complete search history.

(56) References Cited

U.S. PATENT DOCUMENTS 9,849,364 B2 * 12/2017 Tran ........................ G16H 40/63
9,875,510 B1 * 1/2018 Kasper ................... G06Q 40/12
(Continued)

OTHER PUBLICATIONS

Figueiredo, Ricardo Jorge Matos. "Peer to Peer Insurance Over Blockchain." ProQuest Dissertations Publishing, 2017. Print. (Year: 2017).*

(Continued)

*Primary Examiner* — Techane Gergiso
(74) *Attorney, Agent, or Firm* — Perkins Coie LLP

(57) ABSTRACT

A method and system for determining whether a consensus has been achieved for adding a block to a distributed ledger. The system receives a candidate block to add to the distributed ledger and receives block approvals of approving participants for the candidate block. The system calculates a total block approval stake that the approving participants have in the distributed ledger. The system identifies a total stake that participants have in the distributed ledger. When the total block approval stake is at least a threshold fraction of the total skate, the system indicates that the consensus has been achieved for adding the candidate block to the distributed ledger.

20 Claims, 22 Drawing Sheets

Related U.S. Application Data

(60) Provisional application No. 62/672,432, filed on May 16, 2018, provisional application No. 62/623,386, filed on Jan. 29, 2018.

(51) Int. Cl.
  *G06F 16/182* (2019.01)
  *H04L 9/00* (2022.01)
  *G06F 21/62* (2013.01)

(52) U.S. Cl.
  CPC .......... *H04L 9/3247* (2013.01); *G06F 16/182* (2019.01); *H04L 9/50* (2022.05); *H04L 63/1441* (2013.01); *H04L 2209/56* (2013.01)

(56) References Cited

U.S. PATENT DOCUMENTS

| | | | | |
|---|---|---|---|---|
| 10,417,217 B2* | 9/2019 | Pierce | ................ | H04L 9/3268 |
| 11,164,165 B1* | 11/2021 | Andreev | ................ | G06Q 20/02 |
| 2017/0323392 A1* | 11/2017 | Kasper | ................ | H04L 63/123 |
| 2018/0173747 A1 | 6/2018 | Baird | | |
| 2018/0174122 A1 | 6/2018 | Mattingly et al. | | |
| 2018/0248685 A1 | 8/2018 | O'brien | | |
| 2019/0140819 A1 | 5/2019 | Dolev | | |
| 2019/0349426 A1* | 11/2019 | Smith | ................ | H04W 4/08 |

OTHER PUBLICATIONS

Bano, Shehar et al. "Consensus in the Age of Blockchains." arXiv.org (2017): n. pag. Print. (Year: 2017).*
Baliga, Arati. "Understanding blockchain consensus models." Persistent 4.1 (2017): 14. (Year: 2017).*
Nakamoto, Satoshi, "Bitcoin: A Peer-to-Peer Electronic Cash System," http://www.bitcoin.org/bitcoin.pdf, pp. 1-9, Jul. 4, 2010.
Takahashi, S., "Proof-of-Approval: A Distributed Consensus Protocol for Blockchains," Initial version Protocol and reward system updates, Apr. 23, 2018, 25 pages.

* cited by examiner

PROOF-OF-APPROVAL DISTRIBUTED LEDGER

CROSS-REFERENCE TO RELATED APPLICATION

The present application is a continuation of U.S. patent application Ser. No. 16/248,644, filed on Jan. 15, 2019, which claims the benefit of priority to U.S. Provisional Patent Application No. 62/623,386, filed on Jan. 29, 2018, and U.S. Provisional Patent Application No. 62/672,432, filed May 16, 2018, the entire disclosure of each of these applications is incorporated herein by reference.

BACKGROUND

The Bitcoin system was developed to allow electronic cash to be transferred directly from one party to another without going through a financial institution, as described in the white paper entitled "Bitcoin: A Peer-to-Peer Electronic Cash System" by Satoshi Nakamoto. Such "electronic cash" systems are commonly known as cryptocurrency systems. Each participant using a cryptocurrency system is pseudo-anonymous and is known by its cryptographic identity, a sequence of characters, called public key. In addition, each participant also holds a cryptographic "private key" that pairs with its public key and is needed to transfer or spend the owned cryptocurrency. To transfer such electronic cash, a new transaction is created which is digitally signed by the owner's private key. The signing by the owner is an authorization by the owner to transfer ownership to a new owner via this transaction. A transaction is not complete until it has been placed inside a block. A cryptocurrency system, which is referred to as a blockchain system, stores the transactions in blocks of a "blockchain." The cryptocurrency system continually receives many such transactions, which are placed inside blocks. Each block holds transactions in a cryptographic structure called Merkle tree. Once the block is full, the block is "capped" with a block header which contains the hash digest of the Merkle tree containing the transactions. The hash of a block's header is stored in the block header of the next block in the blockchain to create a mathematical hierarchy of blocks. To verify the current ownerships, the blockchain can be followed from the oldest transaction to the newest transaction.

Blocks of the blockchain are publicly available to anyone to view and verify each and every transaction contained in it. Since anyone can view and verify each transaction, no participant can double-spend cryptocurrency (i.e., transfer ownership of the same currency to two or more parties). There is no central location where the blockchain is stored. Rather, the blockchain is just stored at the computers, referred to as nodes of a blockchain network, of the participants who choose to store it. In this way, blockchain systems typically implement a distributed ledger, containing all transactions, that is stored redundantly at multiple nodes (i.e., computers) of a blockchain network. Each node in the blockchain network has a complete replica of the entire blockchain. A blockchain system implements techniques to assist nodes verify that their blockchains are identical, even though the nodes may receive invalid or illegal blocks from different parties in the network. To verify that the copy of the blockchain, stored at a node, is correct, the blocks in the blockchain can be accessed from the newest to the oldest comparing the hash of the previous block to that stored in the next block. If the hashes are the same, then the block and the transactions contained in the block are verified since it is nearly impossible to find different block contents that has the same cryptographic hash. Because a hash of the previous block is stored in the next block, it is nearly impossible to change a transaction and regenerate the remaining blockchain. The Bitcoin system is an example of a blockchain system. Other blockchain systems include Ethereum, Litecoin, Ripple, IOTA, Hyperledger, and so on. At the most basic level, a blockchain system supports transactions of its currency known as "coins" or "native" tokens. The native tokens are an integral part of the distributed ledger system providing incentives to the participants to perform tasks required for proper functioning of the blockchain system. Blockchain systems may use different "blockchain protocols" for operation of their distributed ledgers resulting in different advantages and disadvantages.

Irrespective of the "blockchain protocol" used, blockchain systems also deploy additional layers of functionality on top of the base distributed ledger. The first of such layers is "smart contract," which is computer code that implements a programmable functionality such as a contract. The computer code would be executed by any node that validates transactions related to that smart contract. In addition, the smart contract itself is recorded as a transaction in the blockchain. When deployed, a part of the smart contract code called constructor executes, initializing the smart contract and its state. The state of a smart contract is stored persistently in the blockchain. Once deployed, a contract is given an address similar to a public key but without a corresponding private key. When a transaction is recorded against a smart contract, a message is sent to the smart contract (i.e., recorded in a transaction of the blockchain that identifies the smart contract), and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset other than cryptocurrencies. The inputs to a smart contract to sell a car may be the public keys of the seller and the buyer, an identity token (described below) of the car, and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard.

The next higher functionality layer, built on top of the smart contract layer, is called "application layer." This layer supports decentralized applications (dApps) and tokens representing assets other than cryptocurrency such as digital, physical, virtual, or legal assets. While these tokens cannot be used in functioning of the digital ledger itself like the native tokens, they can be used in transactions just like native tokens. Through use of tokens, distributed ledger systems can support transactions of any type, such as those relating to the sale of vehicles, sale of financial derivatives, sale of stock, payments on contracts, and so on. Tokens, which are also referred to as digital bearer bonds, uniquely identify something that can be owned or can own other things. Tokens also have an owner having their own public/private key pair. The owner's public key is set as the token owner identity, and when performing actions against tokens, ownership proof is established by providing a signature generated by the owner's private key and validated against the public key listed as the owner of the token. Tokens can be used to identify people, institutions, commodities, contracts, computer code, equities, derivatives, bonds, insurance, loans, documents, and so on. Tokens can also be used to identify collections of assets. The creation of a token for an asset in a blockchain establishes provenance of the asset, and the token can be used in transactions (e.g., buying, selling, insuring) involving the asset stored in a blockchain, creating a full audit trail of the transactions.

To record a simple transaction in a blockchain, each participant that is a party to the transaction needs an account that is identified by a public key. For example, when one person wants to transfer a car to another person, the current owner and the next owner create accounts, and the current owner also creates a token that uniquely identifies the car. The token for the car identifies the current owner. The current owner creates a transaction against the token for the car that indicates that the transaction is a transfer of ownership, indicates the public keys of the current owner and the next owner, and indicates the identity token of the car. The transaction is signed by the private key of the current owner, and the transaction is evidence that the next owner is now the current owner.

Many blockchain systems, such as the Bitcoin system, employ distributed consensus techniques to achieve a consensus as to what blocks and what transactions within those blocks are to be included in the blockchain. For example, with the Bitcoin system, a node that creates a transaction broadcasts that transaction to other nodes of the Bitcoin system. The receiving nodes store those transactions. At intervals (e.g., approximately 10 minutes), some of the nodes, referred to as mining nodes, each generates a new block of transactions that the mining node plans on proposing to be added to the blockchain. The new block includes transactions that have not yet been included in any block of the blockchain and a coinbase transaction. The coinbase transaction creates an amount of bitcoin as a mining fee and transfers that amount along with any transaction fees for transactions in the new block to a public key designated by the mining node as a mining reward. A transaction fee of a transaction is the difference between value of the inputs and the value of the outputs of that transaction. The new block also includes a hash of the block that is to be prior to the new block in the blockchain.

Bitcoin uses Proof-of-Work system where the right to create a block is determined by solving a computationally difficult puzzle. An example of such a puzzle is to find a block header whose hash has some desired characteristic, such as 12 leading zero. The header of each block includes a field, referred to as a nonce. A mining node repeatedly tries different values for the nonce until a value for the nonce is found that results in the hash having the desired characteristic. The coinbase transaction also has a nonce. So, if a hash with the desired characteristic cannot be found after all values of the nonce in the header are tried, the mining node can change the value of nonce in the coinbase transaction and then again try all values of the nonce in the header and repeat this process of changing values in the nonces until a hash with the desired characteristic is found. The process of finding a hash with the desired characteristic is referred to as "mining."

After a mining node generates a valid new block, it broadcasts the new block to other nodes as a proposed block. Other mining nodes implicitly consent to having the proposed block included in the blockchain by generating future proposed blocks that include that proposed block in the blockchain. During an interval, multiple mining nodes could generate and broadcast proposed blocks at nearly the same time. Generally, the first proposed block that a node receives will be included in its primary view of the blockchain, but it will also have an alternate view (e.g., a fork) that includes the other proposed blocks. When a mining node generates and broadcasts the next proposed block for the next interval, each mining node will add the next proposed block to its primary view of the blockchain. Upon receiving the next proposed block, a node can then determine whether its primary view or alternate view is the correct view to use going forward. Eventually, each node can assume that a proposed block in the primary view is permanently included in the blockchain based on the number of subsequent proposed blocks (e.g., six) that have been added to the primary view. The process of proposing blocks and deciding which proposed blocks to include in the blockchain is referred as achieving a distributed consensus. Because the mining nodes need to expend computational resources to find the nonce for a proposed block, this distributed consensus is referred to as a Proof-of-Work consensus. That is, each mining node needs to prove that it performed the work to find such a nonce.

Vast amounts of computational resources may be needed for Proof-of-Work mining, but the mining reward can be considerably more than the cost of mining. As a result, mining nodes may employ special purpose hardware and software so that they can be the first to generate a proposed block. Because mining consumes so much electrical power, the mining nodes are often housed near cheap sources of electricity such as hydroelectric power plants. At each interval, each mining node will expend its computational resource to find a nonce. However, except for the first mining node to find the nonce, all the computational resources are essentially wasted as is the vast amount of electrical power used by those other mining nodes. Moreover, the generating of the needed electrical power can cause environmental damage.

As an alternative to a Proof-of-Work consensus and its need for vast amounts of computational resources, some blockchain systems may employ a Proof-of-Stake consensus. A Proof-of-Stake consensus as its name implies relies on a participant's "stake" in the blockchain system. A participant's stake can be based on different type of measurements of involvement with a blockchain system such as frequency and recency of transactions involving a participant, but is generally measured by the amount of cryptocurrency or other unit of value that is owned by the participant in a blockchain at a certain block. For example, a participant who own 10.015 bitcoins as measured at block 14,614 has a stake of 10.015 at block 14,614. The "total stake" of a blockchain at a given block is the sum of the stakes of all the participants at that block. A node could determine the stake of each participant by scanning the entire blockchain each time the stake is needed. Alternatively, a node could initially generate a table that maps participants to their stakes by scanning the blockchain and then update the table as new blocks are added. With a Proof-of-Stake consensus, a node executes a selection function to determine which nodes can propose blocks to be added to the blockchain. The selection function is a random function that is weighted based on the stake of the participant. Thus, participant with large stakes will have the opportunity to propose blocks more frequently than those participants with small stakes.

While the concept of Proof-of-Stake is straight forward, it is incredibly difficult to make a robust distributed ledger using Proof-of-Stake consensus. Blockchains face repeated attacks from maleficent parties who want to gain advantage by exploiting loopholes in the blockchain rules. Proof-of-Work consensus, by requiring consumption of physical resources, naturally deters such attacks. On the other hand, a Proof-of-Stake consensus protocol must be painstakingly designed to avoid any loopholes that could compromise the blockchain. Many initial implementations of Proof-of-Stake have suffered from what are now well-known Proof-of-Stake flaws. These flaws are referred to as "attacks" that an adversarial party can employ to gain advantage in the blockchain network.

A History Attack (a Costless Simulation Attack) attempts to rewrite a Proof-of-Stake blockchain in the attacker's favor. In this attack, an attacker acquires private keys of one or more parties that held a large amount of stake in the network in the past but may not hold any at present. The owners of these private keys may have little incentive to keep these keys private, and an attacker may be able to acquire them relatively inexpensively. Using these private keys, the attacker creates blocks from some time in the past in such a way that the attack chain would be preferred by the network over the honest chain. In a variant of this attack, Short Timespan History Attack, a majority stakeholder in the network quickly sells their entire stake and then attempts to rewrite the blockchain from the time just before selling of their stake. In another attacked, called Nothing at Stake Attack, blockchain participants are unintentionally incentivized to build blocks on all forks if forks were to occur accidentally or deliberately. This makes it easier for adversaries to perform double spending or other attacks relying on forking of the blockchain. As long as the participants believe that such an attack may succeed, they would support the attack by building on top of the attack fork. In another attack, called Bribe Attack, an attacker is able to double spend by bribing other participants in the network. Once a merchant has sent the goods after waiting for the payment transaction to stabilize after a number of block confirmations, an attacker publicly announces their intent to fork the blockchain from just before the payment transaction. If the total bribe needed is less than the payment amount, neither the attacker nor the colluders risk anything. They all win at the merchant's expense. Another attack, a Stake Grinding Attack (or Precompute Attack), applies to network where the right to create blocks is restricted by some random functionality. In this attack, an attacker performs some computation or takes some other steps to try to bias the randomness in their own favor providing the attacker with an unfair proportion of the awards. In a Stake Bleeding Attack, an attacker, leveraging the network's award system and transaction fees over a very long-time period, can successfully builds an attack chain that is preferred by the network compared over the honest chain. As a result, the attacker gains full control of the blockchain. It would be desirable to have a protocol that successfully defends against all these attacks.

DETAILED DESCRIPTION

Figure 1A:
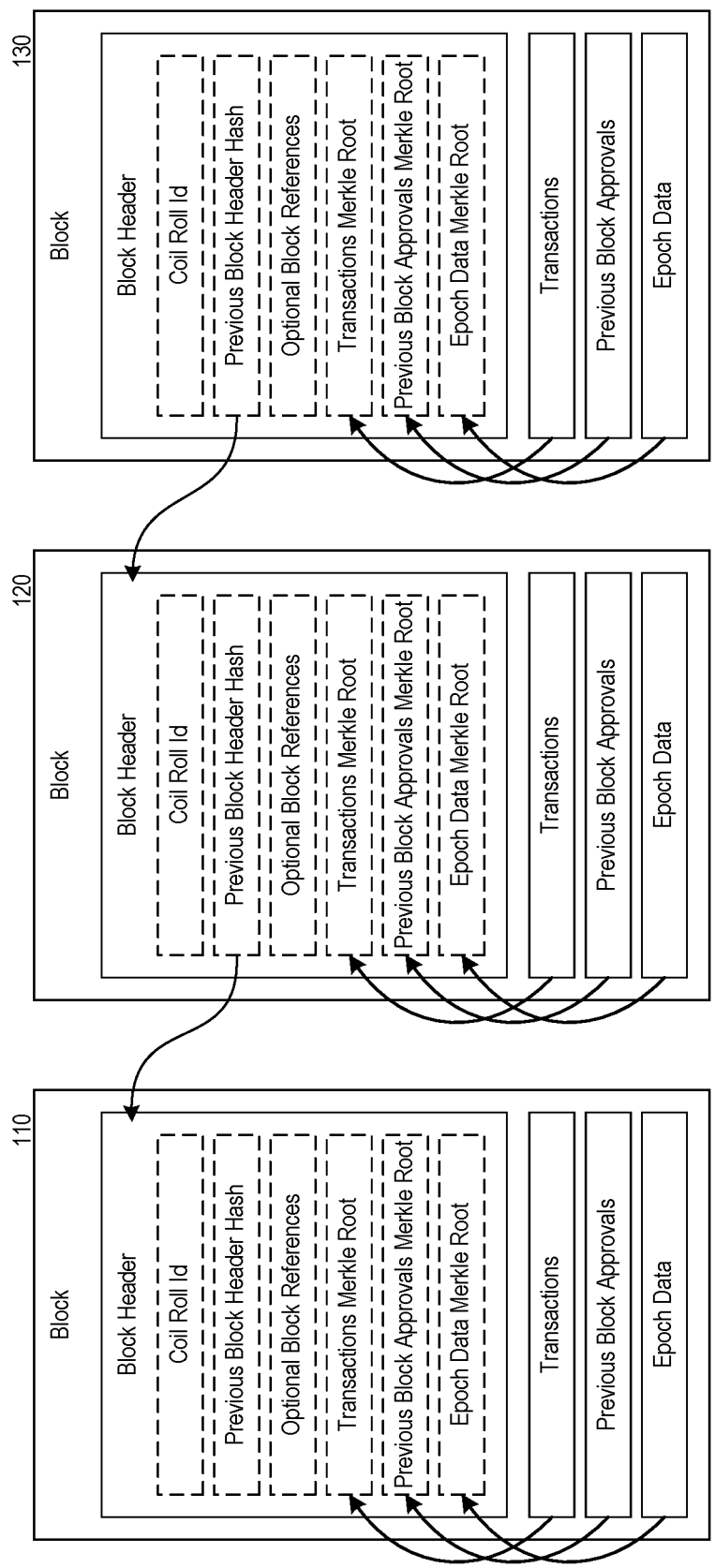
FIG. 1A is a block diagram that illustrates a portion of a blockchain of the PoA system in some embodiments.

A method and system for achieving consensus on adding blocks to a blockchain based on approval of candidate blocks that are proposed to be added to the blockchain. In some embodiments of a Proof-of-Approval ("PoA") system only some participants, referred to as creating participants, are allowed to create candidate blocks for an interval, referred to as a slot. Each creating participant creates a candidate block that includes transactions to be recorded in the blockchain and then broadcasts its candidate block to other participants. Upon receiving a candidate block, a participant validates the candidate block and if valid, sends an approval to the creating participant of the candidate block. Each creating participant collects the approvals for its candidate blocks. If the block approval stake (e.g., sum of the stakes of the approving participants) is greater than a threshold stake, the creating participant generates a block approval list that includes the approvals and broadcasts the block approval list to the participants. Each participant may receive multiple candidate blocks for a slot and a corresponding block approval list for each candidate block. For the next slot, the participants again select creating participants for the next candidate blocks to be added to the blockchain. A creating participant selects a prior candidate block to which its next candidate block is to be added. Because the block approval lists are broadcasted to the participants, a creating participant can use the block approval lists to select a prior candidate block with a high block approval stake. The creating participant creates the next candidate block that includes transactions to be recorded, a reference (or link) to the selected prior candidate block (e.g., hash of its header), and the block approval list that it received for the selected prior candidate block. The creating participant then broadcasts the next candidate block. This processing is performed for each slot. Over time, the blockchain is extended based on the approvals for a primary view or fork, and alternative views or forks will not be extended.

In some embodiments, the PoA system groups slots into a predefined number of sequential slots, referred to as an epoch. The last block of an epoch contains epoch approvals. Epoch approvals are similar to block approvals but are designed to receive approvals from all participants even those on slow or intermittent connections. During each epoch, each participant can broadcast an epoch approval. An epoch approval includes the approving participant's signature on the hash of a block header of a block that was added to the blockchain during that epoch. For the last slot of an epoch, the creating participants add the epoch approvals to the candidate blocks that they create. By using epoch approvals, the PoA system helps defend against History Attacks.

In some embodiments, the PoA system employs incentive and penalty techniques to encourage desired behavior of the participants and discourage undesired behavior of the participants. The PoA system provides awards (e.g., payment of a cryptocurrency) for certain types of desired behavior. The PoA system allows a creating participant to add to a candidate block a transaction that creates and transfers a creation award to the creating participant. So, a creating participant is incentivized to quickly generate and broadcast candidate blocks so that they can be approved and included in the blockchain. In addition, the PoA system allows creating participants to add to candidate block one or more transactions that create and transfer an approval award to each approving participant of the prior candidate block to which the candidate block is linked. As described above, the candidate block includes the approval of all those approving participants. So, an approving participant is incentivized to quickly generate and approve candidate blocks so that they can be included in the blockchain. The PoA system provides a similar incentive to approving participants who provide epoch approvals.

The PoA system provide penalties for certain type of undesired behavior. For a slot, the candidate blocks may link to different prior candidate blocks (e.g., a possible fork). An approving participant may approve multiple candidate blocks for a slot. If an approving participant approves of two candidate blocks that link to different prior candidate blocks, the approvals are considered to be in conflict as the approving participant is explicitly approving different forks. To discourage such behavior, when a creating participant detects such a conflict based on the block approval lists, the creating participant adds a transaction to its candidate block indicating the approving participant is penalized for a certain number of slots. The PoA system may also penalize participants who send multiple epoch approvals based on the same slot of the epoch. When a participant is under penalty, the other participants will discard new transactions involving that participant, will not approve candidate blocks created by that participant, and will discard approvals sent by that participant.

In some embodiments, the PoA system generates a genesis block that is the first block in the blockchain. The genesis block includes transactions that creates units of a cryptocurrency and transfers the units to original participants. The units are referred to as coins and the units may be combined into unit groups referred to as rolls of coins. Each roll has a unique roll identifier. The PoA system supports a create roll transaction that inputs coins and outputs a roll consisting of those coins and assigns a roll identifier and a destroy roll transaction that inputs a roll and outputs coins. The PoA system allows fractions of a coin to be transferred but does not allow fractions of a roll. The genesis block does not require approvals, therefore, the next block of the blockchain may not contain any approvals. Participants can join and leave at will, but only participants with a stake can participate in block creation and approval. The original participants can transfer coins to other participants, and those participants can transfer to other participants.

In some embodiments, the PoA system provides a creator selection function that can be executed to determine whether a participant is authorized to be a creating participant for a certain slot. The PoA system may require that a creating participant have a minimum stake so that only participants with sufficient stake are allowed to create candidate blocks. For example, the PoA system may require a creating participant to own a roll. The creator selection function generates a cryptographically secure number (e.g., a random number or a pseudo random number) for each epoch and uses this random number for creator selection in the next epoch. To generate the random number, each participant eligible to create blocks (i.e., those owning a minimum stake) chooses a number, but does not reveal it to others. To ensure that a participant does not change its number selection, the participant broadcasts a number commitment, the number signed with the participant's private key but without the number itself, to the other participants in the first half of an epoch. The number commitments are recorded in a middle block of each epoch. In the second half of an epoch (i.e., after the number commitments are recorded), each participant eligible to create blocks broadcasts its number to the other participants as part of the epoch approval message. Each participant can verify that a revealed number from another participant is the same as the originally selected number by verifying original number signature with the participant's public key. In each epoch, if a participant, eligible to create blocks, fails to broadcast its number commitment in the first half of the epoch, or fails to reveal the correct number in the second half of the epoch, each epoch block creator includes a penalty transaction penalizing that participant for a certain number of slots. Either all or a subset of these revealed numbers, from the participants with the highest stakes, are combined, using a predefined function, to create a random number. This random number is used for creator selection in the next epoch.

In some embodiments of the PoA system, the creator selection function may input cryptographically secure random number generated in the previous epoch, a slot identifier, and roll identifiers. The slot identifier is an identifier of a current slot. The roll identifier is the identifier of a roll that is owned by the participant whose authorization is to be determined. For each slot, a participant who owns a roll can execute the creator selection function to determine whether it is authorized to be a creating participant based on that roll. In addition, when a participant receives a candidate block, the participant can execute the creator selection function to determine whether the creating participant is authorized and not approve that candidate block if not authorized.

In some embodiments, the PoA system may amass a very large number of participants leading to an exponentially large number of transactions in the network. The PoA system, in such embodiments, may assign a category to each transaction. For example, the categories may be based on asset type such as automobile, precious metal, shares of stock, and so on. The categories may also be generic such category one, category two, and so on. Each category has its own blockchain, called "category subchain" or subchain in the PoA system. All category subchains use the same native cryptocurrency. Each category subchain's consensus is independent of other category subchains and is executed by the participants holding a stake on that subchain. Every transaction must be stored on the subchain belonging to the category assigned to that transaction. If a participant wants to place a spending transaction (i.e., a transaction assigned to a spending category) on a target subchain where they do not hold any stake, the participant transfers some (or all) of their stake from an originating subchain to the target subchain before placing the transaction. Such a cross-subchain transfer takes place in two steps. First, a transaction is placed in the originating subchain to send cryptocurrency to the target subchain, and second, a receive transaction is placed in the target subchain to receive cryptocurrency. The block of the receiving subchain holding the receive transaction holds the hash of not only its previous block but also of the block, of the originating subchain, that stores the corresponding send transaction.

The PoA system is initialized so that there would be only one category. As a result, the entire PoA system would initially have only one subchain, the original subchain, holding all the transactions. As the number of participants increases, due to the network effect, the transaction rate of creating transactions increases. When the transaction rate exceeds some threshold, the participants suggest dividing the current category of the original subchain into a set of new categories and place a divide transaction in the original subchain. A participant who wants to propose that the original subchain be divided publishes a divide transaction. If a divide transaction is placed in the original subchain (indicating approval by the participants of the original subchain) and after the current slot ends, all subsequent blocks are placed in the new subchains representing the new categories. The new subchains have their previous block hash pointing to the last block of the original subchain. The participants in the original subchain may also place send transactions in the original subchain to transfer their assets to one or more new subchains. Participants who do not place such a send transaction have their assets automatically transferred to one of the new subchains based on their transaction history. For example, such a participant may have their native tokens transferred to one subchain and all their other assets transferred to another subchain or may have all their assets transferred to a subchain with a default category. In either case, the participants are free to transfer their assets to any subchain in the blockchain. Any subchain can be further divided based on agreement of its participants.

If a subchain's transaction rate falls below a predefined threshold, its participants can suggest and agree to merging that category subchain with a target subchain. The participants of the target subchain also agree by allowing receive transactions that reference the send transactions to be added to the target subchain. Once such a merge transaction is placed in the subchain, that subchain becomes inactive and all future blocks will be placed in the target subchain. In this case, a block of the target subchain would contain hashes of its previous block and the last block of the now-merged subchain. Because of the dividing and the merging of subchains, the subchains form an acyclic, directed graph with the original subchain as the original vertex and the current subchains that can have transaction added to them as vertices with no outgoing edges.

The PoA system operates most effectively in an environment in which participants have roughly synchronized clocks by which they can identify the current slot. The clocks are roughly synchronized in the sense that any discrepancies between the clocks will be significantly smaller than the length of the time represented by a slot. The PoA system also operates most effectively when the length of the time represented by a slot is significantly larger than the time needed to transmit data (e.g., approvals and candidate blocks) between participants.

The PoA system can operate effectively even when some participants are dishonest as long as the majority of the stake is owned by honest participants. Each participant is uniquely identified by its public key. The PoA system can operate effectively even when some participants have slow connections speeds or go offline. The participants, however, are incentivized to have fast connection speeds so that the participants can receive approval awards. As a result, the nodes of many participants will likely be housed in cloud data centers with a high-speed connection between nodes of the same cloud data center and other cloud data centers.

The following table identifies variable uses to describe various thresholds and criterion of the PoA system.

| | |
|---|---|
| $s_i$ | Party i's stake |
| $sl_r$ | A slot where r is slot identifier. |
| $T_r$ | Total stake (not fraction) at the beginning of slot |

| | |
|---|---|
| | number r |
| δ | Maximum stake fraction that can be transferred in one block, including transaction fees. |
| $v_a$ | New stake fraction allocated for block approvers. |
| $v_c$ | New stake fraction given to the winning block creator. |
| $v_e$ | New stake fraction allocated for epoch approvers. |
| ρ | Quorum stake fraction used for decision making in the network. |

The minimum block approval stake of a candidate block is $\rho \cdot T_r$. In each slot of each subchain, the PoA system allows only a fraction of the total stake to exchange hands. This maximum transfer fraction includes transaction fees for all transactions contained in a block and is represented as $\delta \cdot T_r$. The PoA system operates most effectively when the maximum transfer fraction is significantly smaller than the quorum fraction and the total stake.

$$\delta \ll \rho < 1$$

The block creation award is: $v_c$+Transaction Fees. The approval award is: $v_c \cdot T_r \cdot s_i$. The epoch approval award is: $v_e \cdot T_r \cdot s_i$. The award fractions, $v_c, v_a, v_e$, gradually decrease with increasing r.

In practical implementations, the creation award fraction $v_c$ is significantly smaller than block approval award fraction $v_a$ which approximately equals epoch approval award fraction $v_e$ divided by the number of slots in an epoch (m). This is represented as follows:

$$v_c \ll v_a \approx \frac{v_e}{m} \ll \delta$$

FIG. 1A is a block diagram that illustrates a portion of a blockchain of the PoA system in some embodiments. In this example, blocks 110, 120, and 130 are illustrated. Each block includes a block header, transactions, previous block approvals, and optionally epoch data. The block header includes a roll identifier ("RID"), a previous block header hash ("PBHH"), optional block references ("OBR"), a transactions Merkle root ("TMR"), a previous block approvals Merkle root ("PBAMR"), and optionally an epoch data Merkle root ("EDMR"). The roll identifier is the roll identifier of a roll owned by the creating participant. The PBHH is a hash of the block header of the previous block to which the current block is linked. The OBR are additional header hashes of blocks belonging to other subchains in cases when assets are transferred from one subchain to another or when subchains merge. The TMR is the value of the root node of a Merkle tree of the transactions of the current block. The PBAMR is the value of the root node of a Merkle tree of the previous block approvals that are included in the current block. The EDMR is the value of the root node of a Merkle tree of the epoch data included in the current block. The transactions include each transaction (that has not yet been recorded) that the creating participant includes in the block. The previous block approvals include the block approvals for the previous block to which the current block is linked. There can be two kinds of epoch data: (1) signed numbers if the block is the middle block of an epoch and (2) epoch approvals if the block is the last block of an epoch. Blocks other than the middle and the last blocks of epochs contain no epoch data. The transactions include a hash of a recent block and therefore are "context sensitive," which helps prevent transactions from being used in an attack fork.

Figure 1B:
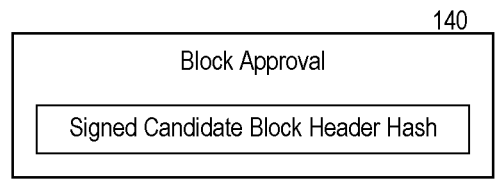
FIG. 1B is a block diagram that illustrates the content of a block approval.

FIG. 1B is a block diagram that illustrates the content of a block approval. Block approval 140 includes the signature of the approving participant on a hash of the header of the candidate block that is being approved. Upon receiving a block approval, the creating participant retrieves the public key for the approving participant and uses it to verify the signature.

Figure 1C:
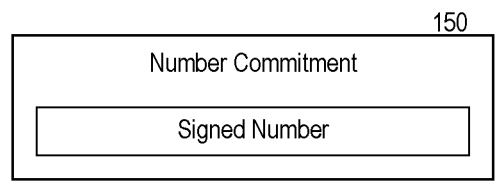
FIG. 1C is a block diagram that illustrates the content of a number commitment.

FIG. 1C is a block diagram that illustrates the content of a number commitment. Number commitment 150 includes the signature of a number chosen by a participant. All participants who hold a minimum stake to qualify to be a creating participant, choose a number, sign it with their private key and broadcast the signed number to other participants during the first half of an epoch.

Figure 1D:
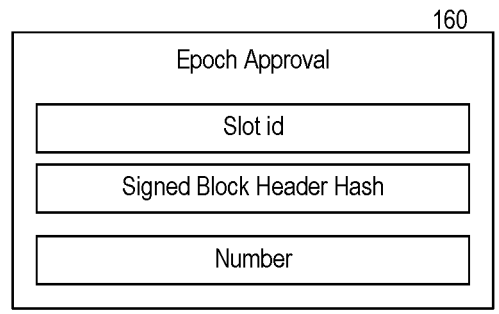
FIG. 1D is a block diagram that illustrates the content of an epoch approval.

FIG. 1D is a block diagram that illustrates the content of an epoch approval. Epoch approval 160 includes a slot identifier, the signature of the approving participant on a header hash of a block within the slot and, if a participant is eligible to create a block, the number of the number commitment. Both the header hash signature and the number of the number commitment are verified using the public key of the participant.

Figure 1E:
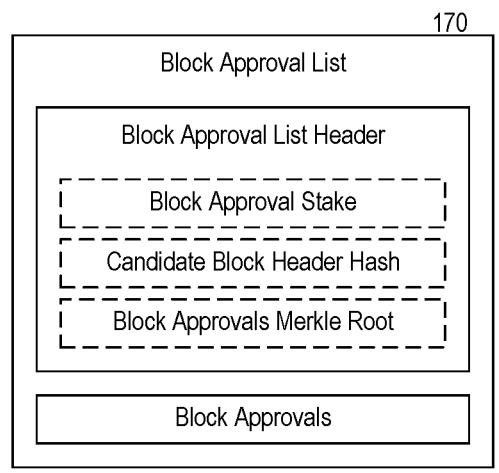
FIG. 1E is a block diagram that illustrates the content of a block approval list.

FIG. 1E is a block diagram that illustrates the content of a block approval list. Block approval list 170 includes a block approval list header and block approvals. The block approval list header includes the block approval stake, the hash of the header of the candidate block, and the root of a Merkle tree of the block approvals.

Figure 2:
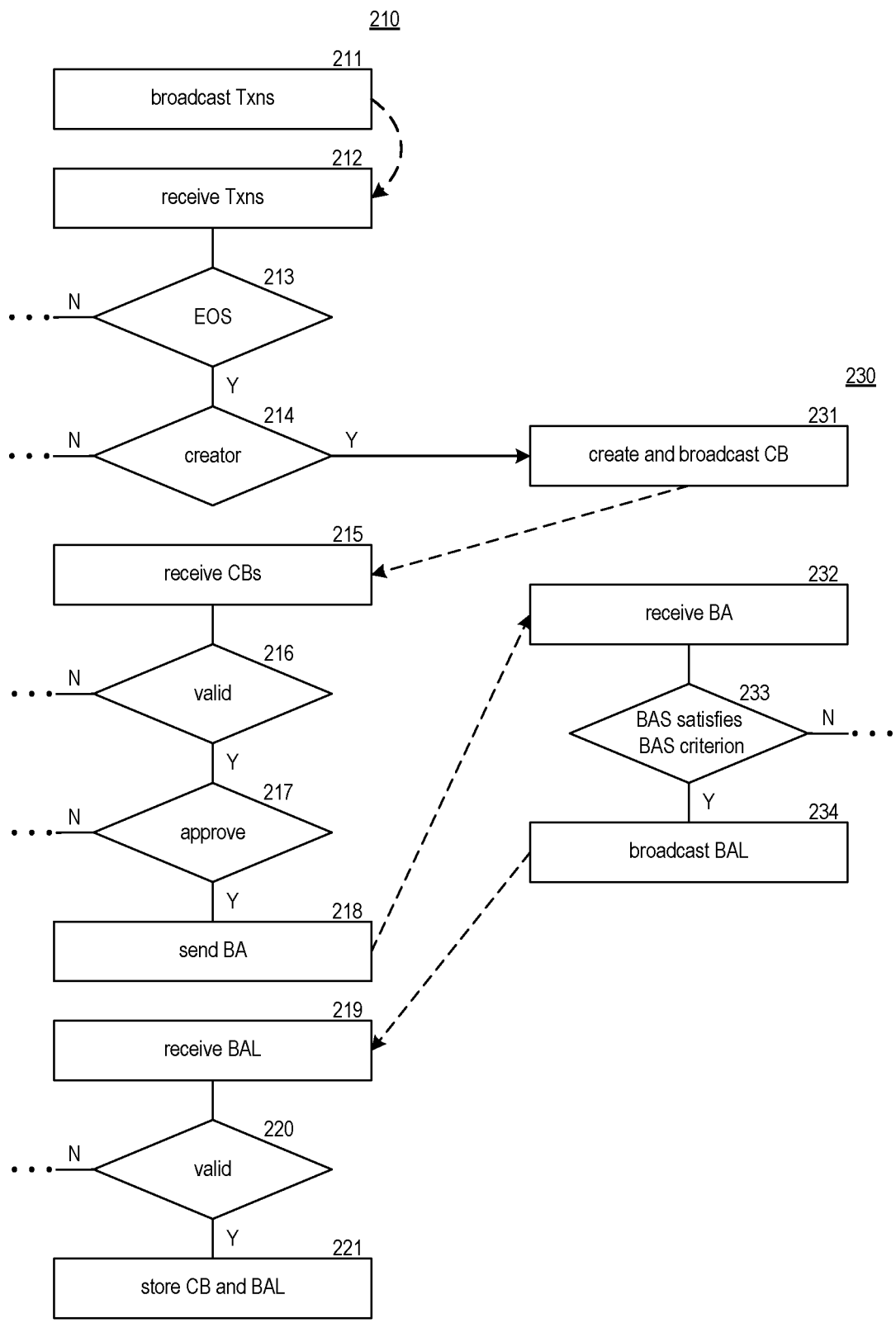
FIG. 2 is a flow diagram that illustrates the overall processing of the PoA system in some embodiments.

FIG. 2 is a flow diagram that illustrates the overall processing of the PoA system in some embodiments. Portion 210 illustrates processing that can be performed by each participant, and portion 230 illustrates processing that can be performed by a creating participant. In block 211, a participant creates and broadcasts transactions that it wants recorded in the blockchain. In block 212, the participant receives transactions that have been broadcasted and stores those transactions. In block 213, the participant determines whether the end of a slot has been reached. For example, if a slot is defined to extend for a certain interval (e.g., every 10 minutes), then the participant checks whether the end of the interval has been reached. If the end of the slot has been reached, then the participant continues at block 214. In block 214, the participant determines whether it is authorized to be a creating participant by executing the creator selection function. If authorized to be a creating participant, the participant continues processing at portion 230. In block 231, the creating participant creates and broadcasts a candidate block that includes the transactions to be recorded and the previous block approvals for the previous block that the candidate block is linked to. In block 215, a participant receives a candidate block. In block 216, the participant validates the candidate block. If valid, the participant continues at block 217. In block 217, the participant checks to see if it approves the candidate block. If approved, the participant continues at block 218. In block 218, the participant sends a block approval to the creating participant of the candidate block that is approved. In block 232, the creating participant receives and stores the block approval and continues at block 233. In block 233, if the block approval stake for the candidate block satisfies a block stake criterion (e.g., greater than a threshold stake), then the creating participant continues at block 234. In block 234, the creating participant creates and broadcasts a block approval list for the candidate block. In block 219, a participant receives the block approval list. In block 220, the participant validates the block approval list. If valid, the participant continues at block 221. In block 221, the participant stores the candidate block and its block approval list. The participant can use the candidate block and its block approval list if authorized to create the next candidate block.

Figure 3:
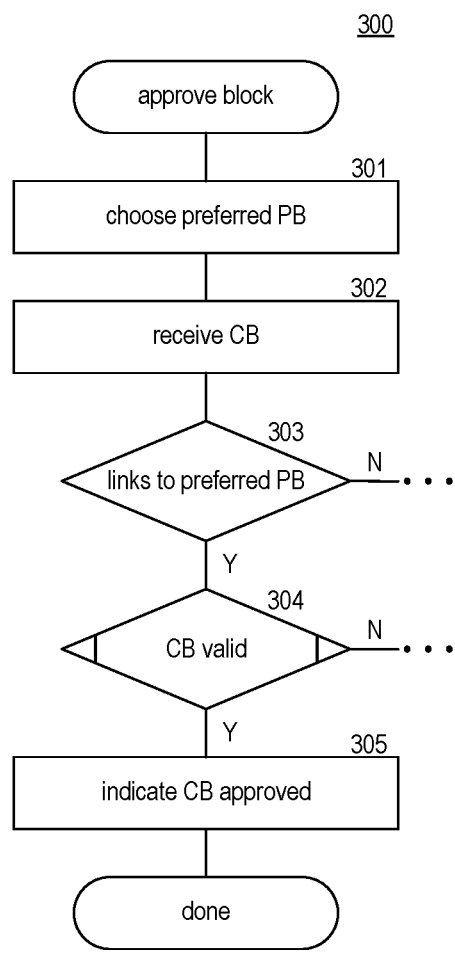
FIG. 3 is a flow diagram that illustrates an approve block component of the PoA system in some embodiments.

FIG. 3 is a flow diagram that illustrates an approve block component of the PoA system in some embodiments. The approve block component 300 determines whether a candidate block should be approved. In block 301, the component chooses a preferred previous block and will approve all valid blocks linking to the chosen previous block. In block 302, the component receives a candidate block. In decision block 303, if the candidate block links to the preferred previous block, then the component continues processing at block 304, else the component does not approve the block. In decision block 304, if the candidate block is valid, then the component continues processing at block 305, else the component does not approve the block. In block 305, the component indicates that the candidate block is approved and completes.

Figure 4:
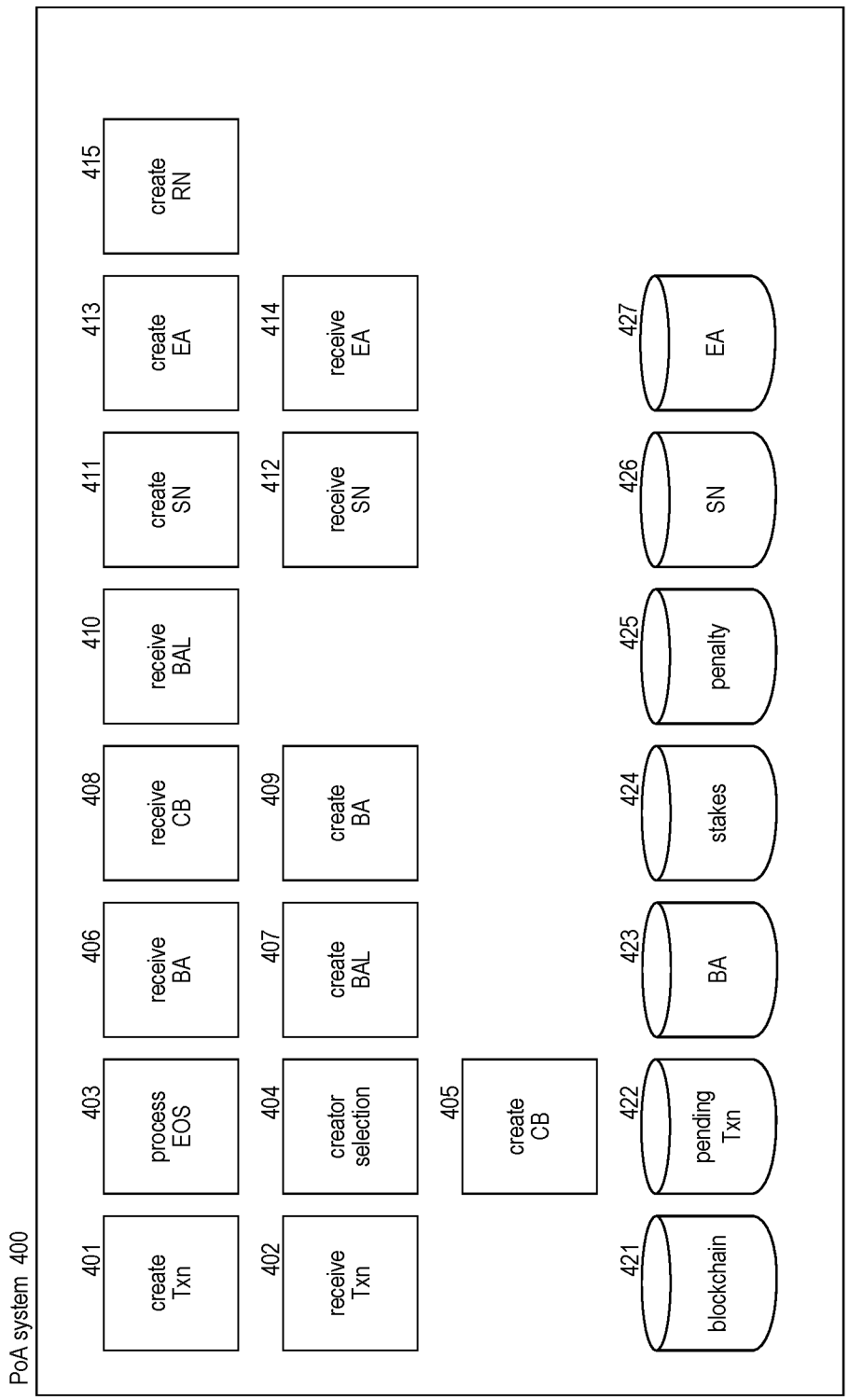
FIG. 4 is a block diagram that illustrates the components of the PoA system in some embodiments.

FIG. 4 is a block diagram that illustrates components of the PoA system in some embodiments. A PoA system 400 includes components 401-415 and stores 421-427. A create transaction component 401 coordinates the creating of transactions. For example, a transaction may transfer of a coin from one participant to another participant, record a smart contract that is to be executed based on subsequent transactions that are recorded, transfer ownership of an asset external to the blockchain such as an automobile, record arbitrary information, and so on. The create transaction component then broadcasts each transaction to the participants. A receive transaction component 402 receives transactions, validates the transactions, and stores the transactions in a pending transaction store 422. The pending transaction store stores all transactions received by a participant that have not been recorded in the blockchain. A process end of slot component 403 is invoked when an end of slot is detected. The end of slot component invokes a creator selection component 404 to determine whether the participant is authorized to create a candidate block for the slot. If authorized, the end of slot component invokes a create candidate block component 405 to create a candidate block and broadcast the candidate block to the participants. A receive block approval component 406 is invoked when a block approval for a candidate block is received. The receive block approval component validates and stores the block approval in a block approval store 423. If the block approval stake for the candidate block satisfies a block approval criterion, then the receive block approval component invokes a create block approval list to create a block approval list and broadcast the block approval list to the participants. A receive candidate block component 408 receives a candidate block and validates it. If the candidate block is linked to the preferred previous block and is valid, then the receive candidate block component invokes a create block approval component 409. The create block approval component creates a block approval and sends it to the creating participant of the candidate block. A receive block approval list component receives and validates a block approval list and stores it in the block approval store 423. A create signed number component 411 is invoked, at the beginning of each epoch, if the participant is eligible to create blocks. The create signed number component chooses a number, signs it with participant's private key and broadcasts the signed number on the network. A receive signed number component 412 receives signed numbers from other participants and stores them in a signed number store 426. A create epoch approval component 413 is invoked when a participant decides to create an epoch approval and broadcasts it to the participants. If the participant is eligible to create blocks, the create epoch approval includes the number chosen by the create signed number component. A receive epoch approval component 414 is invoked when an epoch approval is received, validates each epoch approval, and stores the validate epoch approval in an epoch approval store 427. The create random number component 415 is invoked at the beginning of each epoch and generates a random number from the epoch approvals. This random number is used for selecting creating participants. A blockchain store 421 that stores the blocks of the blockchain including candidate blocks. A stakes store 424 stores the stakes of the participants, which may be generated by scanning the blockchain. A penalty store 425 may store information about penalties that are currently in force to penalize the participants.

The computing systems and devices of the PoA system may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of the computer-readable storage media include memory such as primary memory, cache memory, secondary memory (e.g., DVD), and other storage. The computer-readable storage media may have recorded on it or may be encoded with computer-executable instructions or logic that implements the PoA system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The PoA system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the PoA system may be implemented in hardware using, for example, an application-specific integrated circuit (ASIC) or field-programmable gate array ("FPGA").

Figure 5:
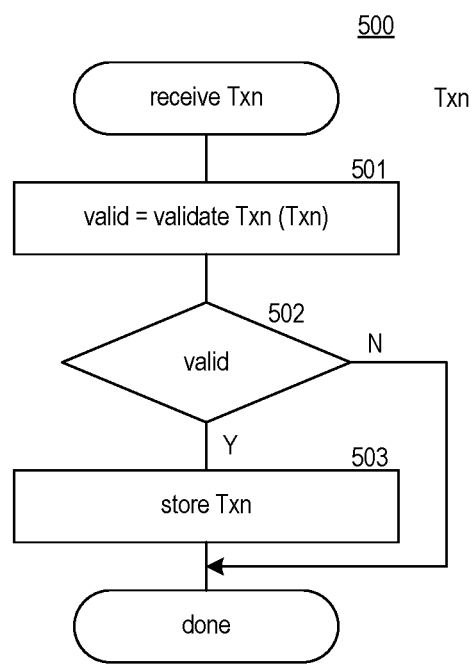
FIG. 5 is a flow diagram that illustrates the processing of a receive transaction component of the PoA system in some embodiments.

FIG. 5 is a flow diagram that illustrates the processing of a receive transaction component of the PoA system in some embodiments. The receive transaction component 500 is passed a transaction and validates and stores the transaction. In block 501, the component validates the transaction. In decision block 502, if the transaction is valid, then the component continues at block 503, else the component completes. In block 503, the component stores the transaction in the pending transaction store and completes.

Figure 6:
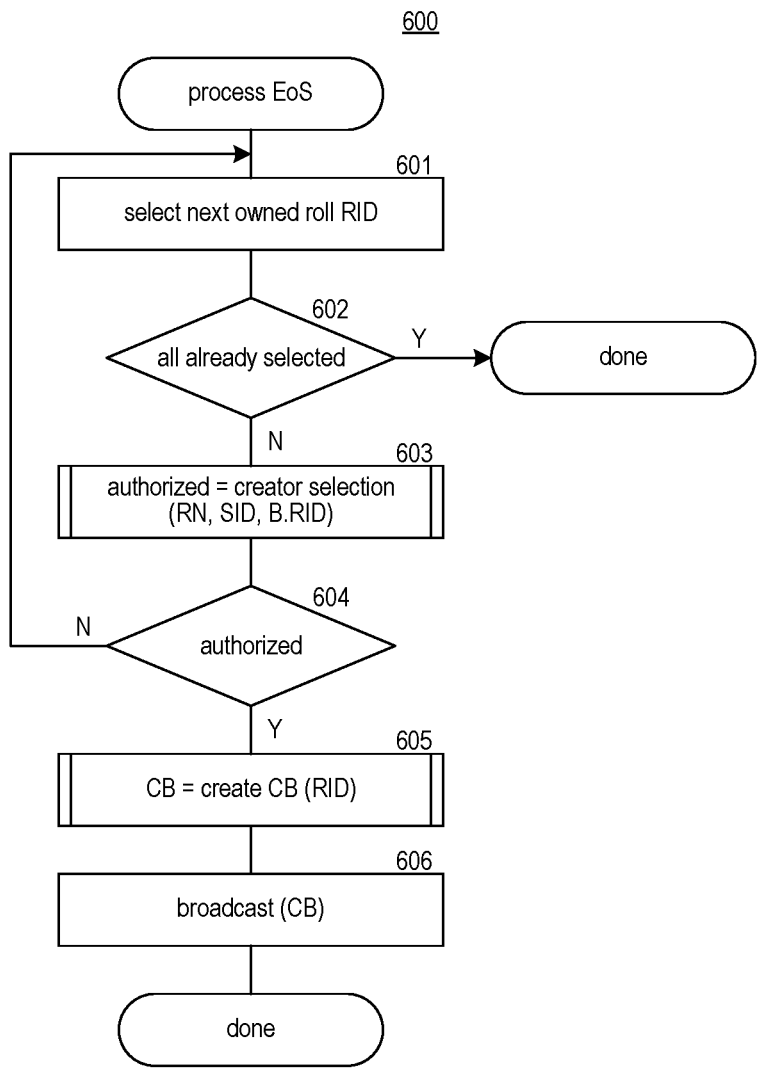
FIG. 6 is a flow diagram that illustrates the processing of a process end of slot component of the PoA system in some embodiments.

FIG. 6 is a flow diagram that illustrates the processing of a process end of slot component of the PoA system in some embodiments. The process end of slot component 600 is invoked when a participant detects that an end of slot has occurred. The component loops performing the slot processing for each roll that is owned by the participant. In block 601, the component selects the next roll that is owned by the participant. In decision block 602, if all the rolls have already been selected, then the component completes, else the component continues at block 603. In block 603, the component invokes the creator selection component to determine whether the participant is authorized to be a creating participant for the selected roll. In decision block 604, if the participant is authorized, then the component continues at block 605, else the component loops to block 601 to select the next roll that is owned by the participant. In block 605, the component invokes a create candidate block component passing an indication of the roll to create a candidate block. In block 606, the component broadcasts the candidate block to the participants. The component then completes.

Figure 7:
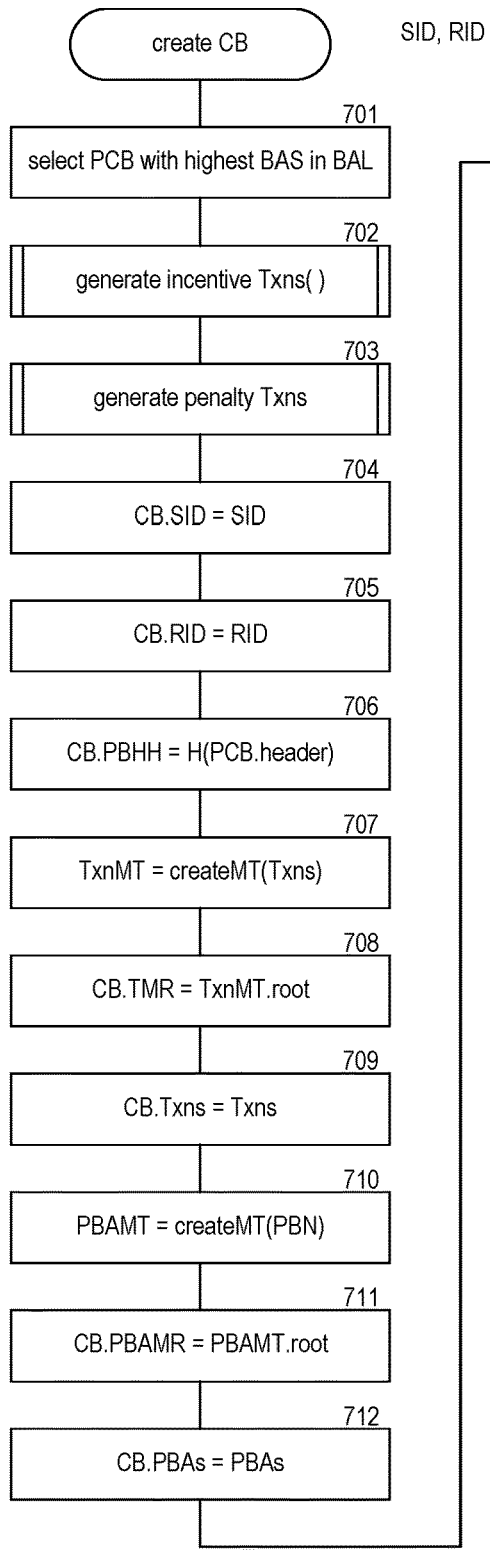
FIG. 7 is a flow diagram of a create candidate block component of the PoA system in some embodiments.
Figure 7:
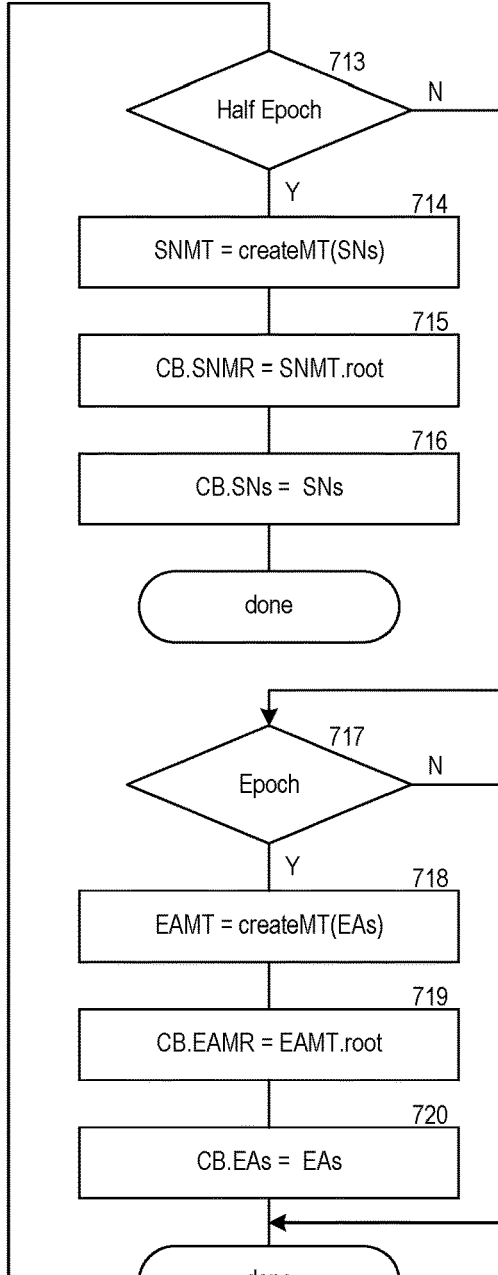

FIG. 7 is a flow diagram of a create candidate block component of the PoA system in some embodiments. The create candidate block component 700 is passed a slot identifier ("SID") and a roll identifier ("RID") and creates a candidate block based on the pending transactions. In block 701, the component selects the previous candidate block it prefers typically with the highest block approval in a block approval list. In block 702, the component invokes a generate incentive transactions component to generate incentive transactions for the creation award, the approval awards for the approvals of the previous block and, if it is the last block of the epoch, the approval awards for the epoch approvers. In block 703, the component invokes a generate penalty transactions component to generate penalty transactions for conflicts in approvals or other undesired behavior. In block 704, the component sets the slot identifier of the candidate block to the passed slot identifier. In block 705, the component sets the roll identifier for the current block to the passed roll identifier. In block 706, the component sets the previous block header hash to a hash of the header of the selected previous candidate block. In block 708, the component creates a Merkle tree (or some other hash tree) of the transactions to be included in the candidate block. In block 709, the component sets the transaction Merkle root of the current block to the root of the Merkle tree. In block 710, the component stores the transactions in the current block. In block 711, the component creates a Merkle tree based on the prior block approvals to be included in the transaction. In block 712, the component sets the prior block approval Merkle root of the current block to the root of the prior block approval Merkle tree. In block 713, the component stores the prior block approvals in the current block. In decision block 714, if the slot represents a half epoch, then the component continues at block 715, else the component continues at decision block 718. In block 715, the component creates a Merkle tree of the signed numbers stored in the signed numbers store. In block 716, the component sets the signed number Merkle root of the current block to the root of the signed number Merkle tree. In block 717, the component stores the signed numbers in the current block and then completes. In decision block 718, if the slot represents end of an epoch, then the component continues at block 719, else the component completes. In block 719, the component creates a Merkle tree of the epoch approvals stored in epoch approval store. In block 720, the component sets the epoch approval Merkle root of the current block to the root of the epoch approval Merkle tree. In block 721, the component stores the epoch approvals in the current block and then completes.

Figure 8:
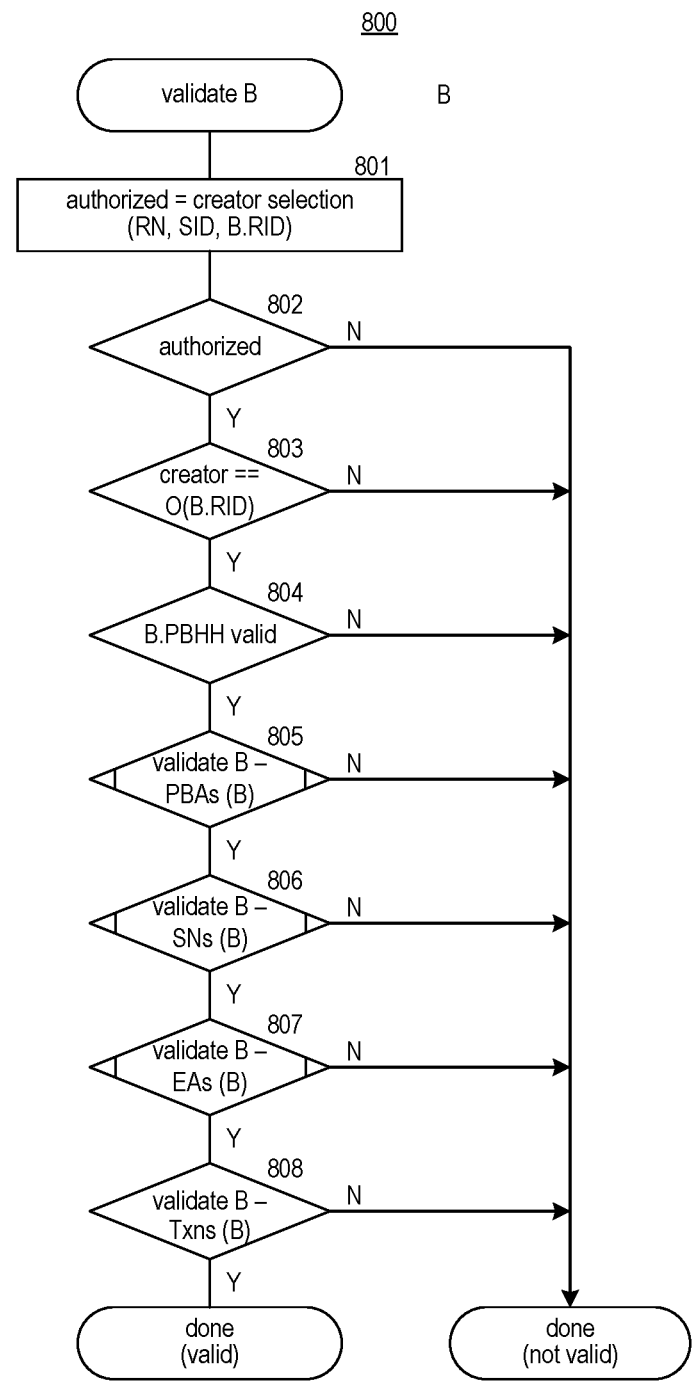
FIG. 8 is a flow diagram that illustrates the processing of a validate block component of the PoA system in some embodiments.

FIG. 8 is a flow diagram that illustrates the processing of a validate block component of the PoA system in some embodiments. The validate block component is invoked to validate whether a candidate block is valid. In block 801, the component invokes the creator selection function to determine whether the creating participant of the block is authorized to create the block. In decision block 802, if the creating participant is authorized, then the component continues at block 803, else the component completes indicating that the candidate block is not valid. In decision block 803, if the creating participant is the owner of roll identified by the block, then the component continues at block 804, else the component completes indicating that the candidate block is not valid. In decision block 804, if the prior block header hash of the block is valid, then the component continues at block 805, else the component completes indicating that the candidate block is not valid. In decision block 805, if the previous block approvals in the candidate block are valid, then the component continues at block 806, else the component completes indicating that the candidate block is not valid. In decision block 806, if the signed numbers, if any, are valid, then the component continues at block 807, else the component completes indicating that the candidate block is not valid. In decision block 807, if the epoch approvals, if any, of the candidate block are valid, then the component continues at block 808, else the component completes indicating that the candidate block is not valid. In decision block 808, if the transactions in the candidate block are valid, then the component completes indicating that the candidate block is valid, else the component completes indicating that the candidate block is not valid.

Figure 9A:
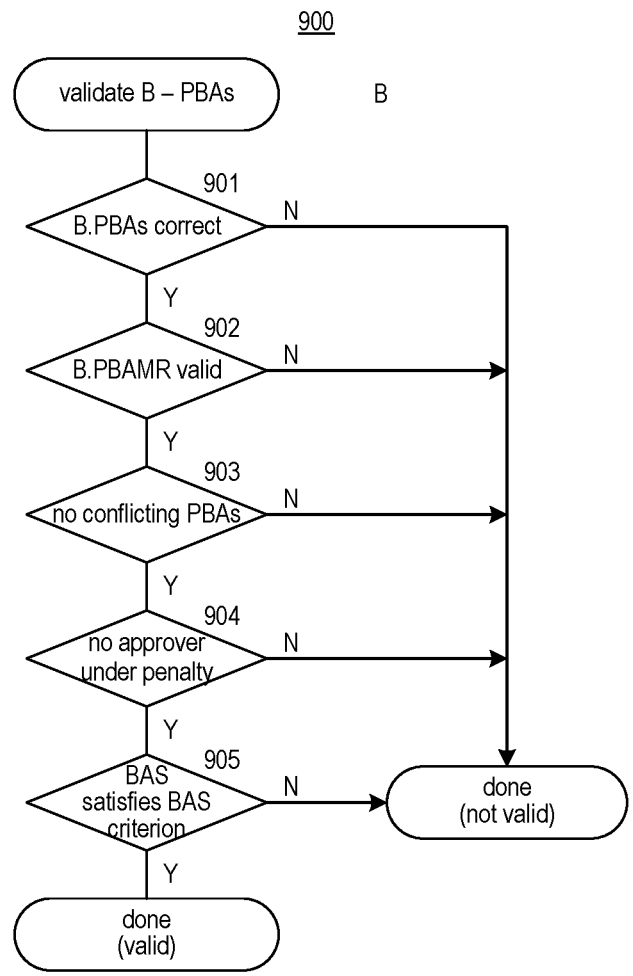
FIG. 9A is a flow diagram that illustrates the processing of a validate prior block approvals component of the PoA system in some embodiments.

FIG. 9A is a flow diagram that illustrates the processing of a validate prior block approvals component of the PoA system in some embodiments. The validate prior block approvals component 900 is invoked passing a block to validate the prior block approvals of that block. In decision block 901, if the prior block approvals are correct such as by being in correct format, signed by the proper approving entities, and so on, then the component continues at block 902, else the component completes indicating that the prior block approvals are not valid. In decision block 902, if prior block approval Merkle root of the block is valid, then the component continues at block 903, else the component completes indicating that the prior block approvals are not valid. In decision block 903, if the prior block approvals contain no conflicting prior block approvals, then the component continues at block 904, else the component completes indicating that the prior block approvals are not valid. In decision block 904, if no approving participant is under a penalty, then the component continues at block 905, else the component completes indicating that the prior block approvals are not valid. In decision block 905, if the block approval stake satisfies a block approval stake criterion, then the component completes indicating that the prior block approvals are valid, else the component completes indicating the prior block approvals are not valid.

Figure 9B:
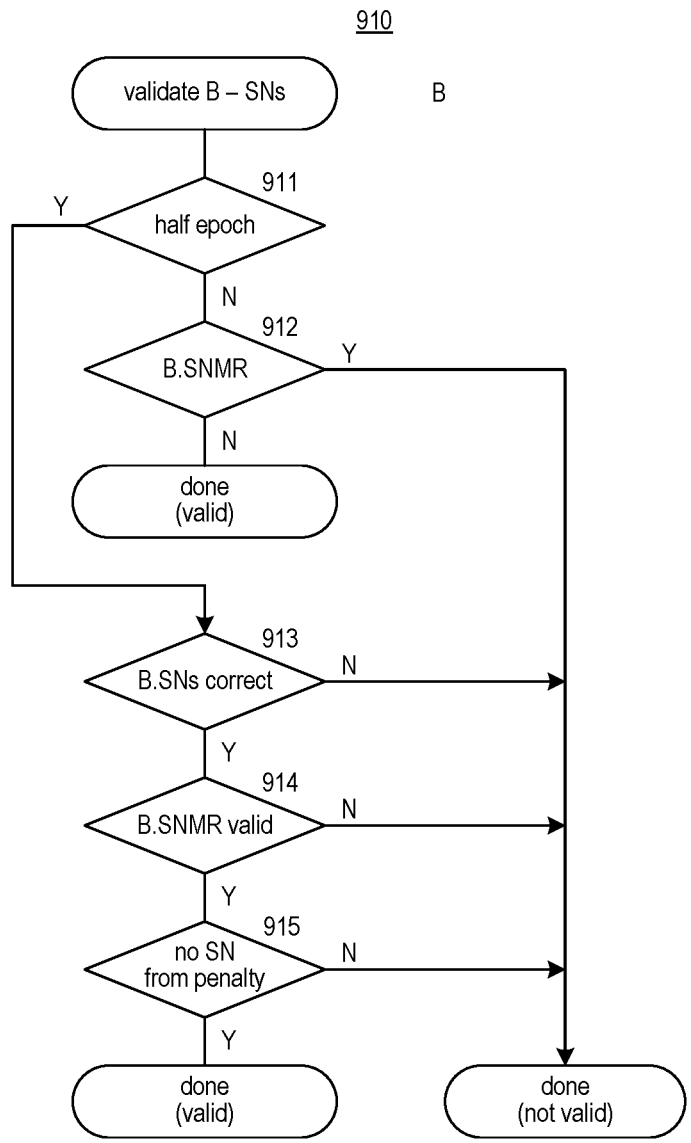
FIG. 9B is a flow diagram that illustrates the processing of a validate signed numbers component of the PoA system in some embodiments.

FIG. 9B is a flow diagram that illustrates the processing of a validate signed number component of the PoA system in some embodiments. The validate signed number component 910 is invoked passing a block to validate that contains a signed number Merkle tree. In decision block 911, if the block is the last block before the middle of the epoch, the component continues at block 913, otherwise, the component continues at block 912. In decision block 912, if the block contains a signed number Merkle tree or root, then the component completes indicating the signed numbers are not valid, else the component completes indicating that signed numbers are valid. In decision block 913, if each signed number is valid, then the component continues at block 914, else the component completes indicating the signed numbers are not valid. In decision block 914, if the signed number Merkle root of the block is valid, then the component continues at block 915, else the component completes indicating that the signed numbers are not valid. In decision block 915, if no number signing entity is under a penalty, then the component completes indicating that signed numbers are valid, else the component completes indicating that the signed numbers are not valid.

Figure 9C:
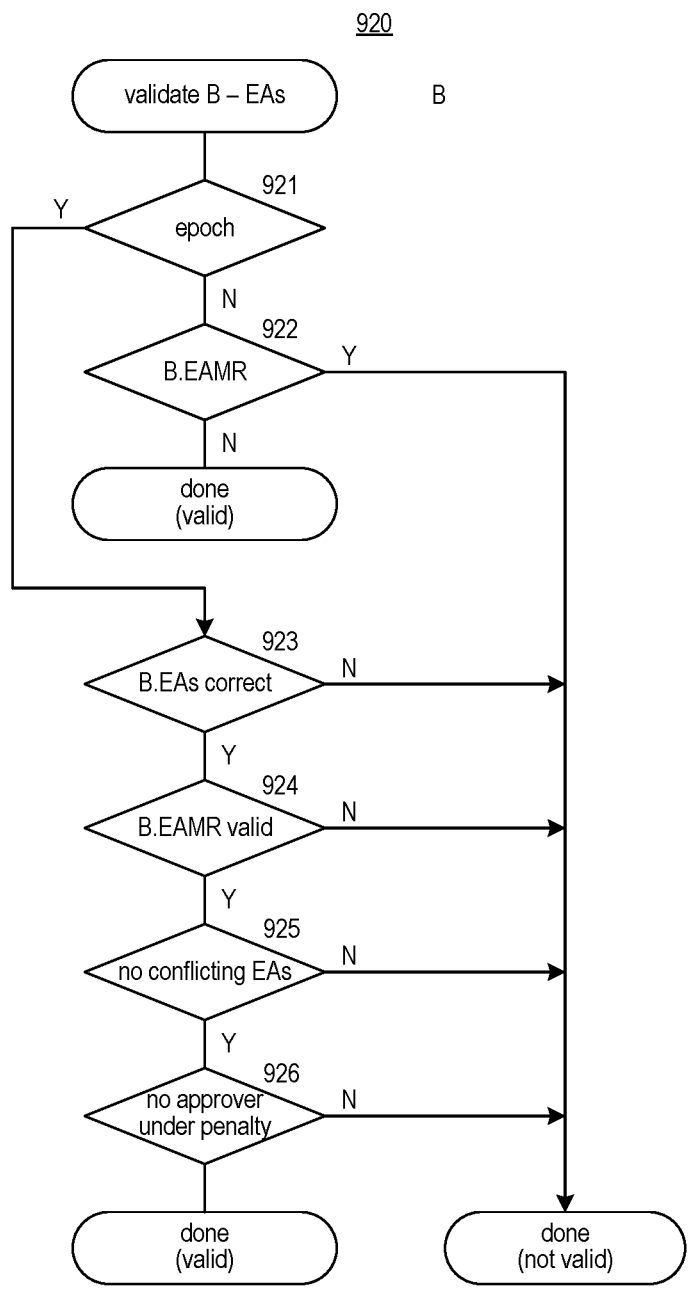
FIG. 9C is a flow diagram that illustrates the processing of a validate epoch approvals component of the PoA system in some embodiments.

FIG. 9C is a flow diagram that illustrates the processing of a validate epoch approval component of the PoA system in some embodiments. The validate epoch approval component 920 is invoked passing a block to validate that contain the epoch approval Merkle tree. In decision block 921, if the block is the last block of the epoch, then the component continues at block 923, else the component continues at block 922. In decision block 922, if the block contains an epoch approval Merkle tree or root, then the component completes indicating the epoch approvals are not valid, else the component completes indicating that epoch approvals are valid. In decision block 923, if each epoch approval is valid, then the component continues at block 924, else the component completes indicating the epoch approvals are not valid. In decision block 924, if the epoch approval Merkle root of the block is valid, then the component continues at block 925, else the component completes indicating that the epoch approvals are not valid. In decision block 925, if the epoch approvals contain no conflicting epoch approvals, then the component continues at block 926, else the component completes indicating that the epoch approvals are not valid. In decision block 926, if no epoch approver is under a penalty, then the component completes indicating that the epoch approvals are valid, else the component completes indicating that the epoch approvals are not valid.

Figure 10:
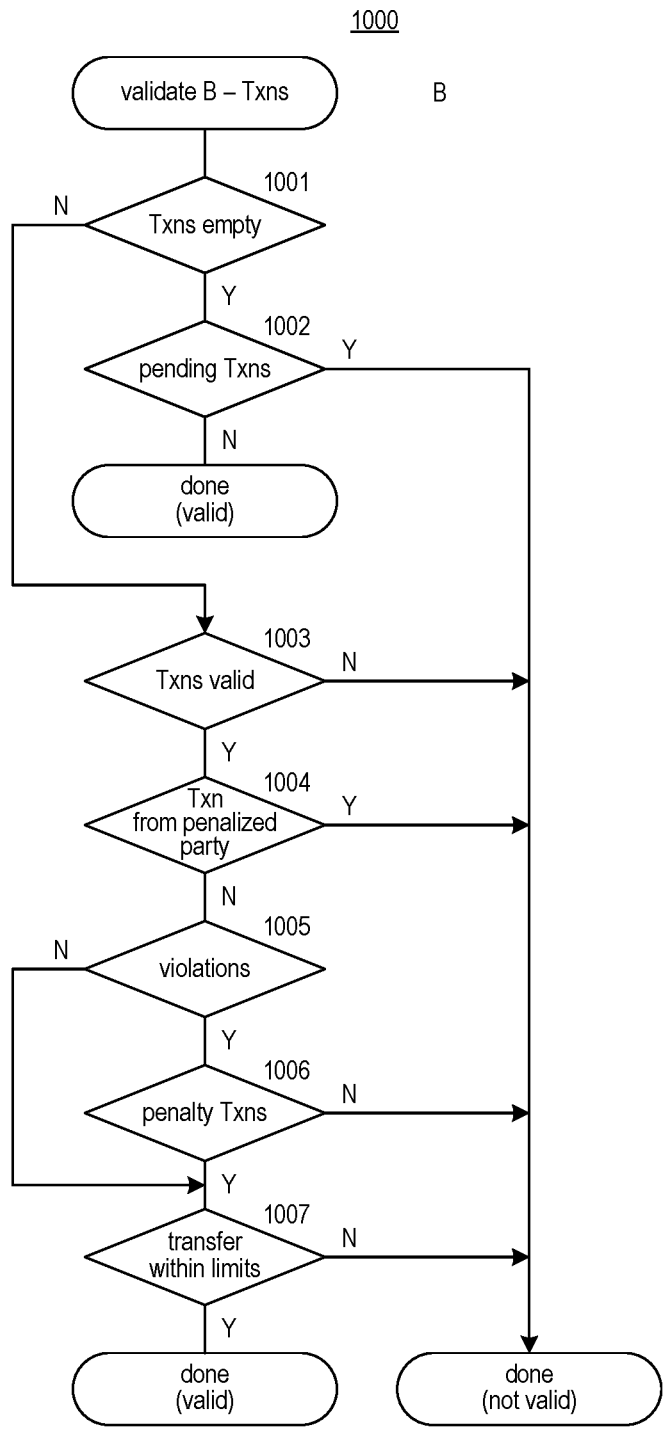
FIG. 10 is a flow diagram that illustrates the processing of a validate transactions component of the PoA system in some embodiments.

FIG. 10 is a flow diagram that illustrates the processing of a validate transactions component of the PoA system in some embodiments. The validate transactions component is invoked to validate the transactions in a block. In decision block 1001, if the block has transactions, then the component continues at block 1003, else the component continues at block 1002. In decision block 1002, if there are pending transactions, then the component completes indicating that the transactions are not valid, else the component completes indicating that the transactions are valid. In decision block 1003, if the transactions are each valid, then the component continues at block 1004, else the component completes indicating that the transactions are not valid. In decision block 1004, the transactions are from a penalized party, then the component completes indicating that the transactions are not valid, else the component continues at block 1005. In decision block 1005, if there are any block or epoch violations, then the component continues at block 1006, else the component continues at block 1007. In decision block 1006, if the appropriate penalty transactions are included for violations, then the component continues at block 1007, else the component completes indicating that the transactions are not valid. In decision block 1007, if the transactions exceed block or epoch transfer limits, then the component completes indicating that the transactions are not valid, else the component completes indicating that the transactions are valid.

Figure 11:
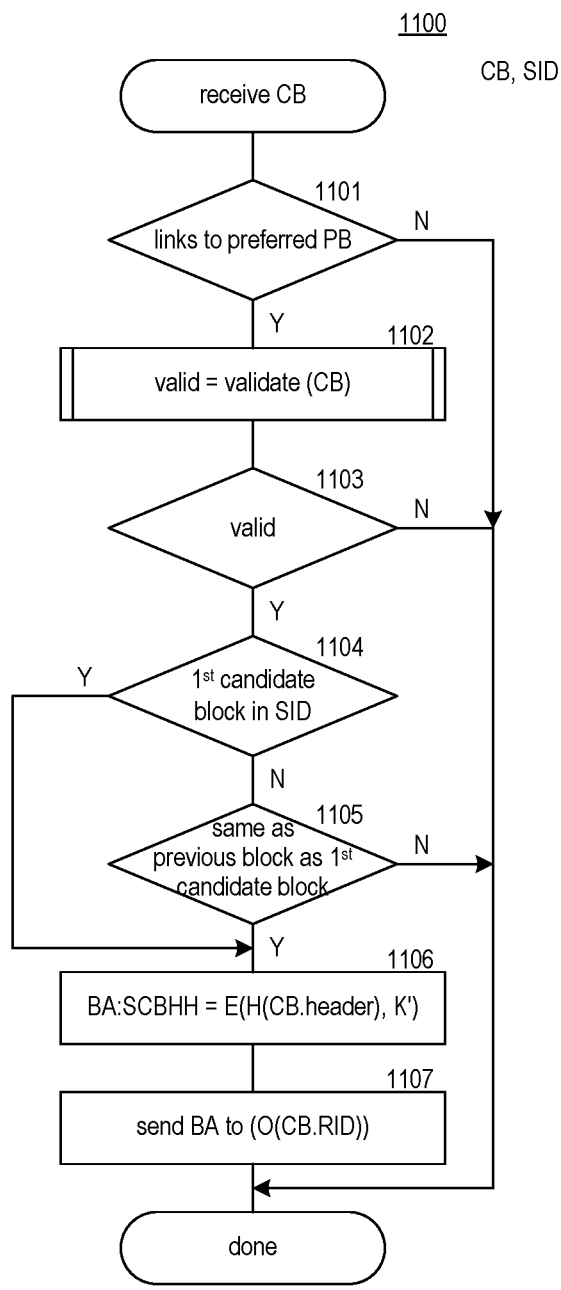
FIG. 11 is a flow diagram that illustrates the processing of a receive candidate block component of the PoA system in some embodiments.

FIG. 11 is a flow diagram that illustrates the processing of a receive candidate block component of the PoA system in some embodiments. The receive candidate block component 1100 receives a candidate block and a slot identifier and sends a block approval if the candidate block is valid. In decision block 1101, if the candidate block links to the preferred previous block, then the component continues at block 1102, else the component completes. In block 1102, the component invokes the validate component passing an indication of the candidate block. In decision block 1103, if the candidate block is valid, then the component continues at block 1104, else the component completes. In decision block 1104, if the candidate block is the first candidate block submitted by the creating participant for the current slot, then the component continues at block 1106, else the component continues at block 1105. In block 1105, if the previous block referenced by the candidate block is the same as in the first candidate block received from the same creating participant, then the component continues at block 1106, else the component may record penalty information for the creating participant and completes. In block 1106, the component sets the signature of the candidate block header hash ("SCBHH") of the block approval to the participant's signature of the hash of the header of the candidate block. In block 1107, the component sends the block approval to the owner of the roll identified in the candidate block and then completes.

Figure 12:
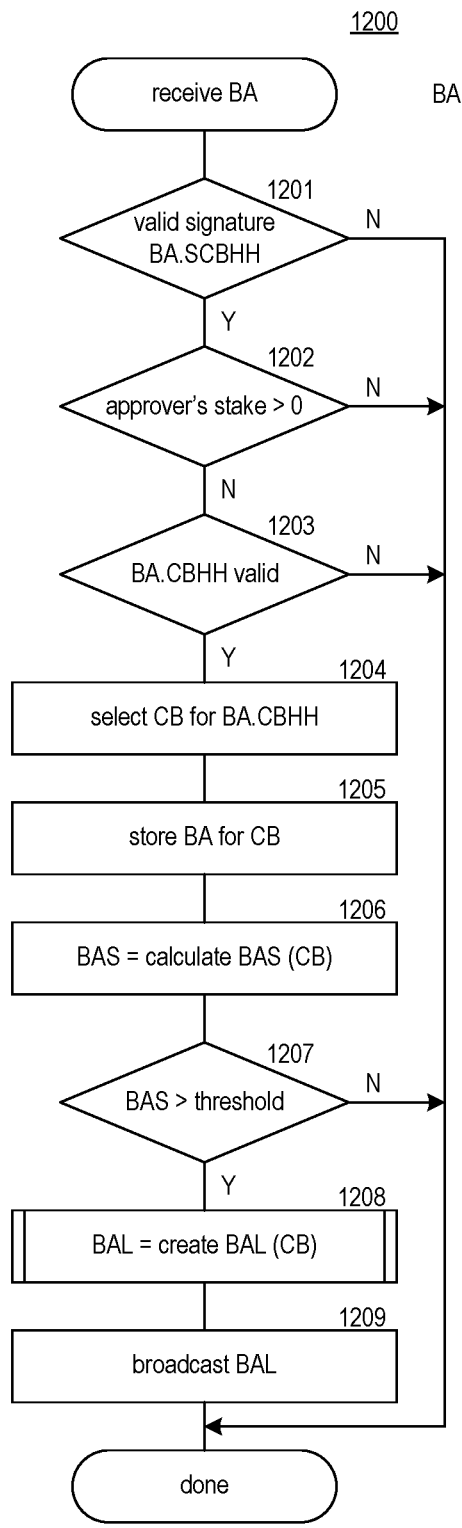
FIG. 12 is a flow diagram that illustrates the processing of a receive block approval component of the PoA system in some embodiments.

FIG. 12 is a flow diagram that illustrates the processing of a receive block approval of the PoA system in some embodiments. The receive block approval component 1200 is invoked when a block approval is received. In decision block 1201, if the signature of the candidate block header hash is valid, then the component continues at block 1202, else the component completes. In block 1202, if the approving participant stake is greater than zero or some other threshold, then the component continues at block 1213, else the component completes. In decision block 1203, if the candidate block header hash of the block approval is valid, then the component continues at block 1204, else the component completes. In block 1204, the component selects the candidate block identified by the candidate block header hash. In block 1205, the component stores the block approval associated with a candidate block. In block 1206, the component calculates the block approval score for the candidate block. In decision 1207, if the block approval score is greater than a threshold, then the component continues at block 1208, else the component completes. In block 1208, the component invokes a create block approval list component to create a block approval list for the candidate block. In block 1209, the component broadcasts the brock approval list to the participants and completes.

Figure 13:
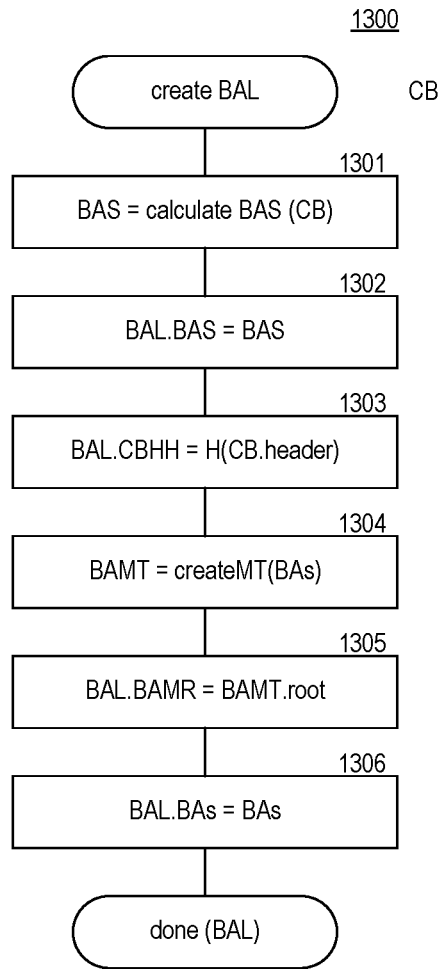
FIG. 13 is a flow diagram that illustrates the processing of a create block approval list component of the PoA system in some embodiments.

FIG. 13 is a flow diagram that illustrates the processing of a create block approval list of the PoA system in some embodiments. The create block approval list component 1300 is invoked to create a block approval list for a candidate block. In block 1301, the component invokes the calculate block approval stake component to calculate a block approval stake for the current block. In block 1302, the component sets the block approval stake of the block approval list. In block 1303, the component sets the current block header hash of the block approval list. In block 1304, the component creates a Merkle tree for the block approvals ("BAMT"). In block 1305, the component sets the block approval Merkle root ("BAMR") of the block approval list to the root of the block approval Merkle tree. In block 1306, the component stores the block approvals in the block approval list and completes.

Figure 14:
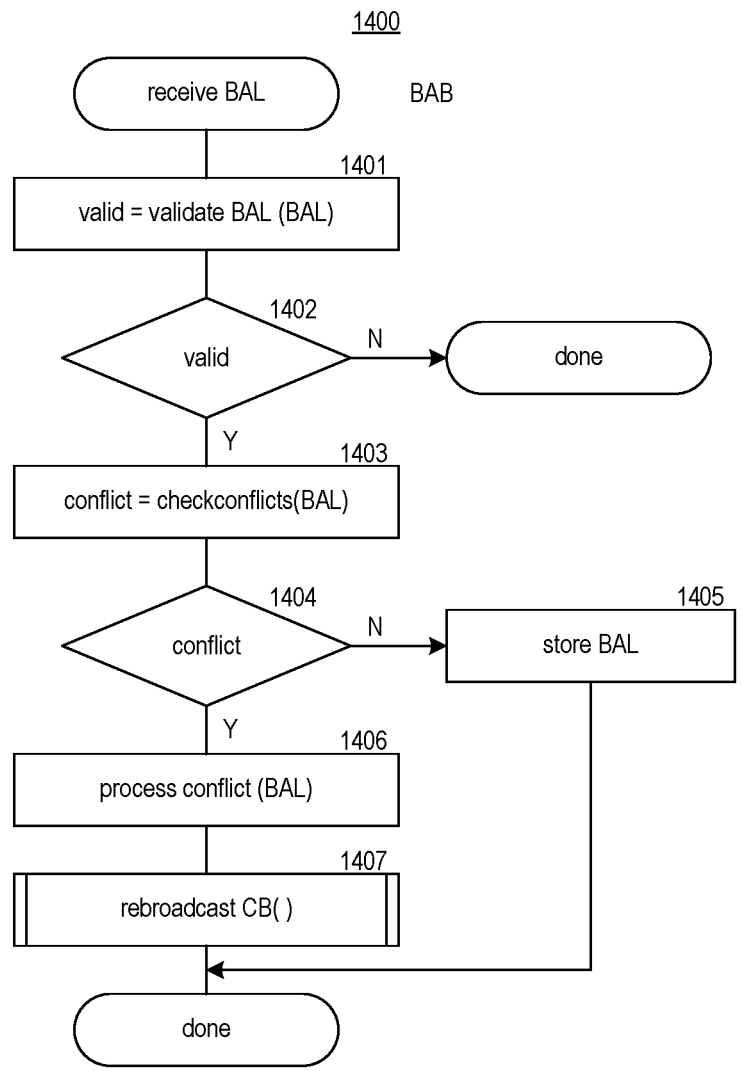
FIG. 14 is a flow diagram that illustrates processing of a receive block approval list component of the PoA system in some embodiments.

FIG. 14 is a flow diagram that illustrates the processing of a receive block approval list of the PoA system in some embodiments. A receive block approval list component 1400 is invoked when a block approval list is received. In block 1401, the component validates the block approval list. In decision block 1402, if the block approval list is valid, then the component continues at block 1403, else the component completes. In block 1403, the component checks for conflicts in the block approval list. In decision block 1404, if the block approval list includes conflicts with another block approval list, then the component continues at block 1406, else the component continues at block 1405. In block 1405, the component stores the block approval list and completes. In block 1406, the component processes the conflicts of the block approval list, for example, by removing the conflicting block approval lists and store an indication of the approving participant that submitted the conflicting approval. In block 1407, the component invokes a rebroadcast candidate block component to rebroadcast a candidate block based on the conflicting block approvals and then completes.

When a creating participant receives, from another creating participant, a block approval list that has a higher block approval stake, the creating participant may want to rebroadcast a block approval list with a higher block approval stake if possible in hopes of winning the creation award, as creating participants are incentivized to link to the prior block with the highest block approval stake. Candidate blocks may have the same block approval stake. In such a case, a creating participant selects the previous candidate block with the fewest approvals to discourage participants from splitting their stakes. If the candidate blocks have the same number of approvals, a creating participant selects the candidate block having the approval with the smallest value of the signature on the hash of the header of the prior candidate block.

Figure 15:
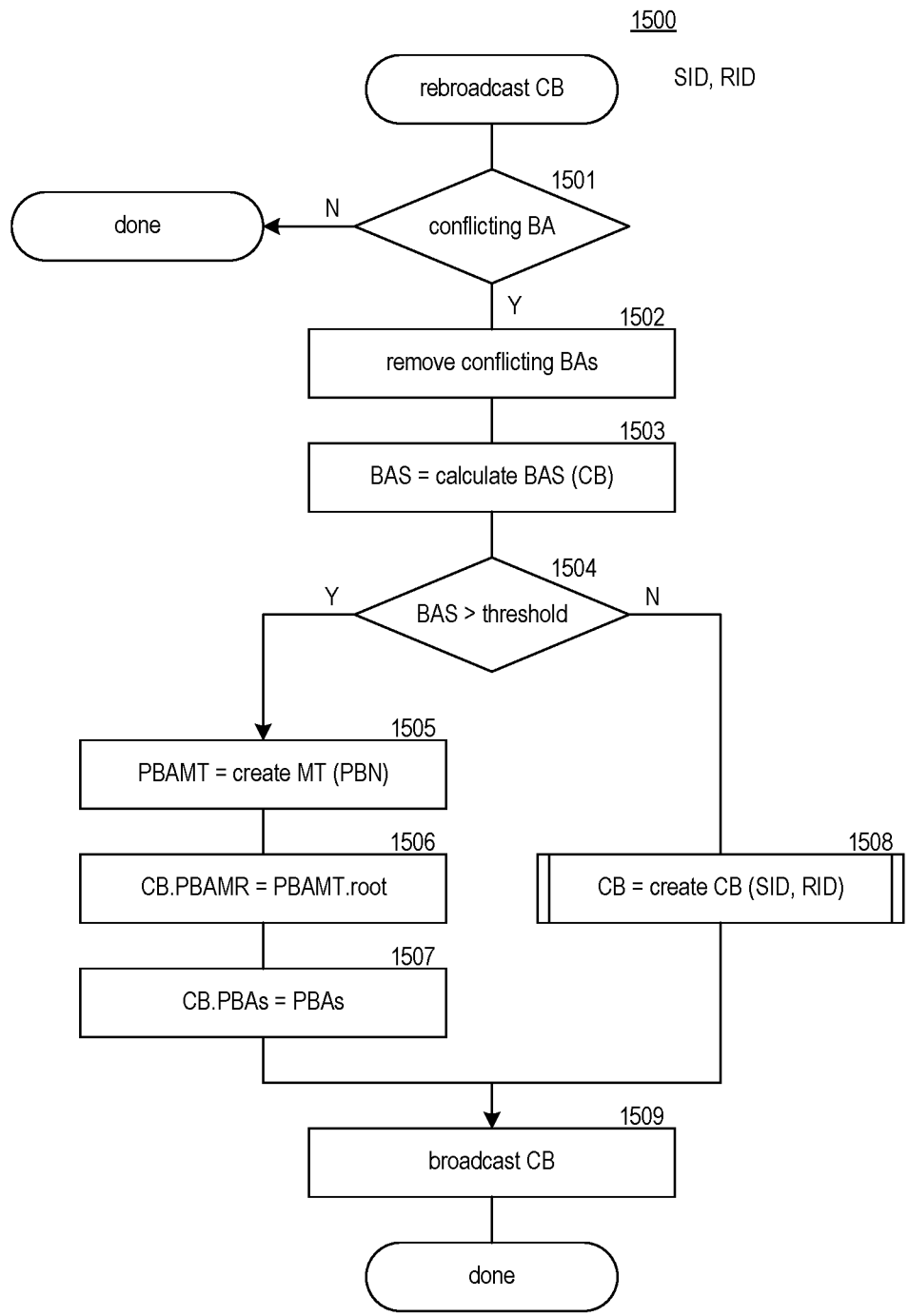
FIG. 15 is a flow diagram that illustrates processing of a rebroadcast candidate block component of the PoA system in some embodiments.

FIG. 15 is a flow diagram that illustrates the processing of a rebroadcast candidate block component of the PoA system in some embodiments. The rebroadcast candidate block component 1500 is invoked to determine whether a candidate blocks should be rebroadcasted without a conflicting approval. In decision block 1501, if the selected candidate block has a conflicting block approval, then the component continues at block 1502, else the component completes. In block 1502, the component removes the conflicting block approval for the selected candidate block. In decision block 1503, the component calculates a new block approval stake for the candidate block. In decision block 1504, if the block approval stake is greater than the threshold, then the component continues at block 1505, else the component continues at block 1508. In block 1505, the component creates a new Merkle tree from the updated previous block approvals. In block 1506, the component updates the Merkle root of the candidate block with the root of updated Merkle tree. In block 1507, the component stores the updated previous block approvals in the candidate block, then continues at block 1509. In block 1508, the component generates an entirely new candidate block by invoking the create candidate block component and then continues at block 1509. In block 1509, the component broadcast either the updated or newly created candidate block, then the component completes.

Figure 16:
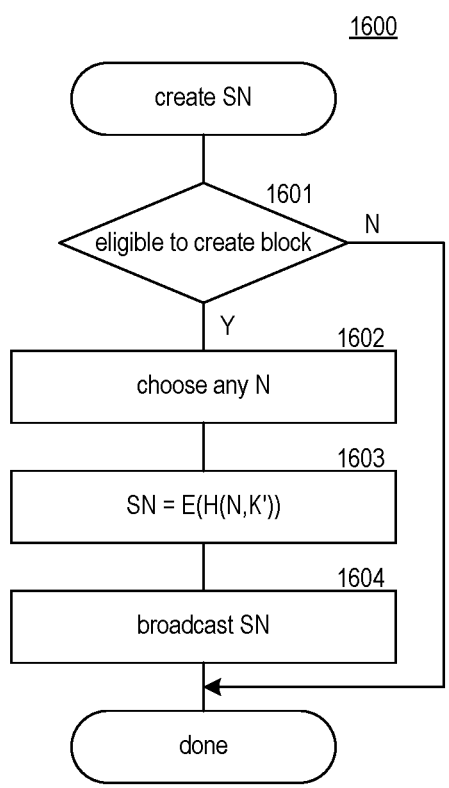
FIG. 16 is a flow diagram that illustrates the processing of a generate signed number component of the PoA system in some embodiments.

FIG. 16 is a flow diagram that illustrates the processing of a create signed number component of the PoA system in some embodiments. The create signed number component 1600 is invoked to generate a signed number for a participant. In decision block 1601, if the participant is eligible to create blocks, then the component continues at block 1602, else the component completes. In block 1602, the component chooses any number. In block 1603, the component signs that number with the participant's private key. In block 1604, the component broadcasts the signed number and completes.

Figure 17:
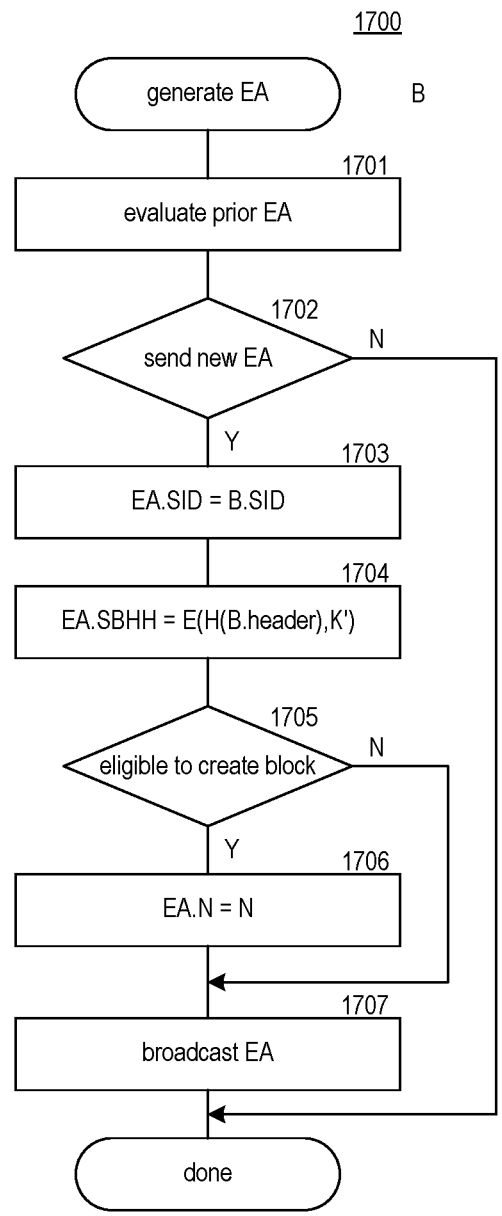
FIG. 17 is a flow diagram that illustrates the processing of a generate epoch approval component of the PoA system in some embodiments.

FIG. 17 is a flow diagram that illustrates the processing of a generate epoch approval component of the PoA system in some embodiments. The generate epoch approval component 1700 is invoked to generate an epoch approval for a participant. In block 1701, the component evaluates any prior epoch approval that the participant sent for the current epoch. In decision block 1702, if the evaluation indicates that a new epoch approval should be sent, then the component continues at block 1703, else the component completes. In block 1703, the component sets the slot identifier for the epoch approval to the slot identifier for the current block. In block 1704, the component sets the signature of the block header hash ("SBHH") of the epoch approval. In decision block 1705, if the participant is eligible to create blocks, then the component continues at block 1706, else the component continues at block 1707. In block 1706, the component sets the unsigned number whose signature was broadcast earlier in the epoch. In block 1707, the component broadcasts the epoch approval and completes.

Figure 18:
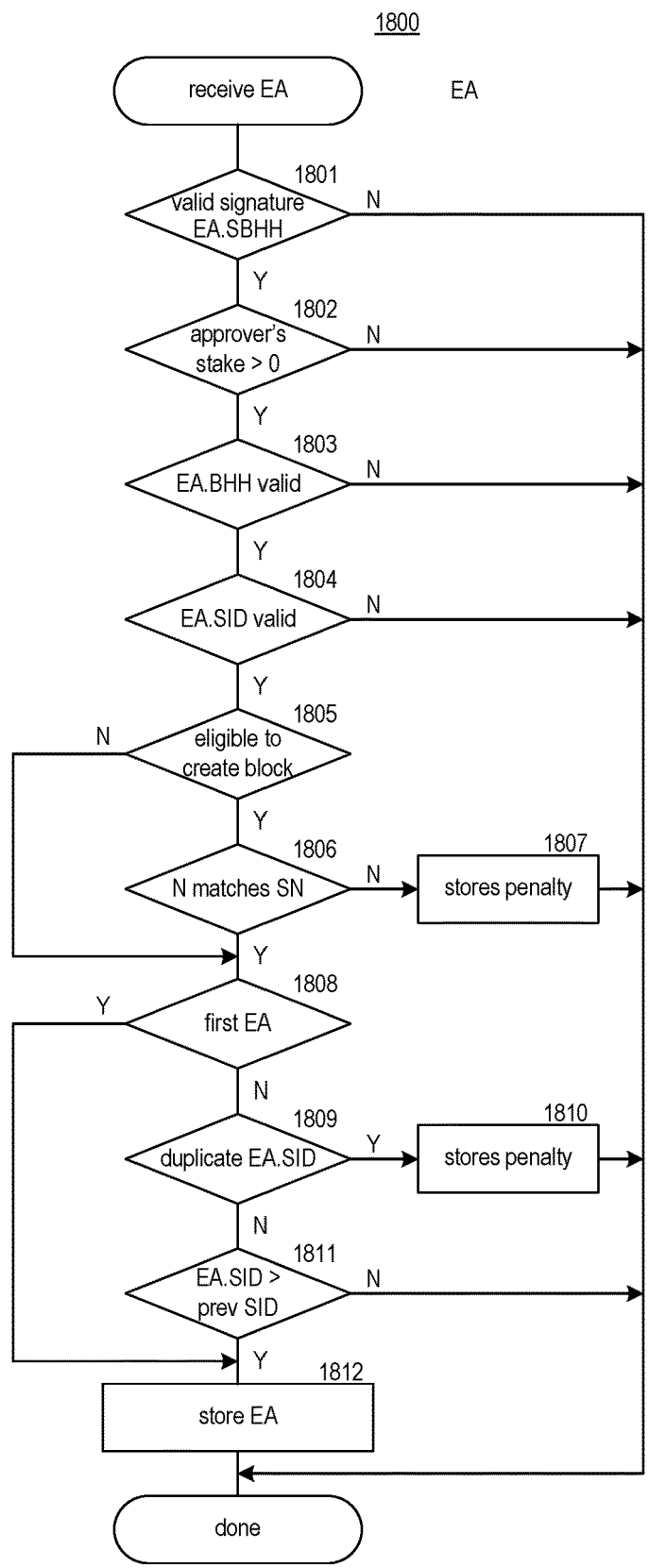
FIG. 18 is a flow diagram that illustrates the processing of a receive epoch approval component of the PoA system in some embodiments.

FIG. 18 is a flow diagram that illustrates the processing of a receive epoch approval component of the PoA system in some embodiments. The receive epoch approval component is invoked when an epoch approval is received. In decision block 1801, if the signature of the block header hash of the epoch approval is valid, then the component continues at block 1802, else the component completes. In decision block 1802, if the approver stake is greater than zero, then the component continues at block 1803, else the component completes. In decision block 1803, if the block header hash of the epoch approval is valid, then the component continues at block 1804, else the component completes. In decision block 1804, if the slot identifier for the epoch approval is valid, then the component continues at block 1805, else the component completes. In decision block 1805, if the epoch approving participant is eligible to create blocks, then the component continues at block 1806, else the component continues at block 1808. In decision block 1806, if the number included in the epoch approval does not match the signed number broadcast by that participant, or if the number is missing, then the component continues at block 1807, else the component continues at block 1808. In block 1807, the component stores an indication of a penalty for the participant for not sending correct number and then completes. In decision block 1808, if this is the first epoch approval from that participant for the current epoch, then the component continues at block 1812, else the component continues at block 1809. In decision block 1809, if the epoch approval for a slot is a duplicate of one previously received from the same participant, then the component continues at block 1810, else the component continues at block 1811. In block 1810, the component stores an indication of a penalty for the participant for sending the conflicting epoch approval and then completes. In decision block 1811, if the slot identifier in the current epoch approval is greater than that in the previous epoch approval sent by the participant, then the component continues at block 1812, else the component completes. In block 1812, the component stores the epoch approval and then completes.

Figure 19:
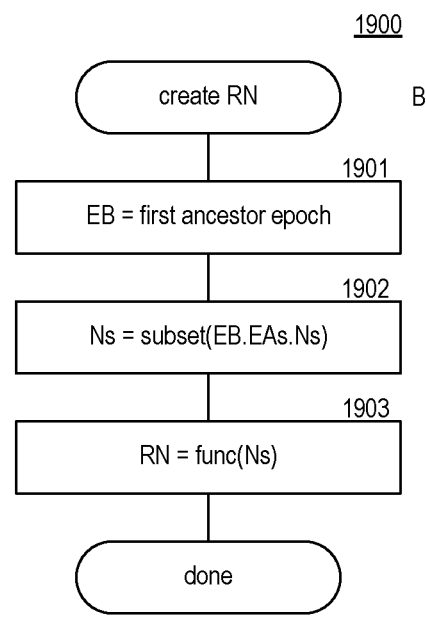
FIG. 19 is a flow diagram that illustrates the processing of a generate random number component of the PoA system in some embodiments.

FIG. 19 is a flow diagram that illustrates the processing of create random number component of the PoA system in some embodiments. In block 1901, the component selects the nearest ancestor epoch block (i.e., the last block of an epoch). In block 1902, the component copies all or a subset (typically consisting of numbers from the largest stakeholders) of the unsigned numbers stored in the epoch block. In block 1903, a random number is generated using a preselected function of these unsigned numbers. The random number is used, along with slot id, and roll id to determine block creation eligibility.

The following paragraphs describe various embodiments of aspects of the PoA system. An implementation of the PoA system may employ any combination of the embodiments. The processing described below may be performed by a computing device with a processor that executes computer-executable instructions stored on a computer-readable storage medium that implements the PoA system.

In some embodiments, a method performed by a computing system is provided for determining whether a consensus has been achieved for adding a block to a distributed ledger. The method includes receiving a candidate block to add to the distributed ledger. The method includes receiving block approvals for the candidate block, each block approval provided by an approving participant in the distributed ledger. The method includes calculating a total block approval stake that the approving participants have in the distributed ledger. The method includes identifying a total stake that participants have in the distributed ledger. The method includes, when the total block approval stake is at least a threshold fraction of the total skate, indicating that the consensus has been achieved for adding the candidate block to the distributed ledger. In some embodiments, the block approvals are included in a subsequent candidate block that is received after the candidate block. In some embodiments, the method further includes using validating the candidate block and each block approval and suppressing the indicating of the consensus when the candidate block or a block approval is not valid. In some embodiments, the candidate block includes prior block approvals and the validating of the candidate block includes validating the prior block approvals. In some embodiments, the candidate block includes transactions and the validating of the candidate block includes validating the transactions. In some embodiments, the method further includes validating the candidate block and when the validating indicates that the candidate block is valid, sending to a creating participant of the candidate block a block approval for the candidate block. In some embodiments, the method further includes broadcasting an epoch approval based on the candidate block. In some embodiments, the method further includes executing a creator selection function to determine whether a participant is authorized to be a creating participant of a candidate block. In some embodiments, the creator selection function is based on a portion of the total stake, the total approval stake of a prior block, an identifier associated with the participant, a total number of participants, and a time identifier. In some embodiments, a portion of the total stake is based on a total number of unit groups, the identifier is an identifier of a unit group owned by the participant, and the time identifier is a slot identifier. In some embodiments, the method further including, when the participant is authorized to be a creating participant, creating a candidate block and broadcasting the created candidate block. In some embodiments, the method further including receiving block approvals for the created candidate block and broadcasting a block approval list containing valid block approvals. In some embodiments, the block approval list has a block approval stake that satisfies a block approval stake criterion. In some embodiments, the block approval stake is a sum of the stakes of the approving participants who sent a block approval of the block approval list. In some embodiments, the block approval stake criterion is a threshold fraction of the total stake of the participants. In some embodiments, stakes are expressed in units, fractions of unit, and unit groups, each unit group having a predefined number of units. In some embodiments, the candidate block includes a transaction that inputs the predefined number of units and creates a unit group from the predefined number of units, the unit group having a group identifier. In some embodiments, the candidate block includes a transaction that destroys a unit group and outputs units of the unit group. In some embodiments, candidate block includes previous block approvals for a previous candidate block and one or more transactions that allocate a creator stake to the creating participant of the previous candidate block and an approver stake to each approving participant of a previous approval. In some embodiments, the creator stake is based on a creator fraction of the stake of the creating participant and each approver stake is based on an approval fraction of the stake of the approving participant. In some embodiments, the candidate block includes previous block approvals for a previous candidate block and includes a transaction that penalizes an approving participant who broadcasts an invalid previous block approval for the previous candidate block.

In some embodiments, a computer-readable storing medium storing a block is provided. The block comprises a header that includes a unit group identifier, a previous block header hash, a transactions hash tree root. and a previous block approvals hash tree root. The block also comprises transactions and previous block approvals. In some embodiments, the header further comprises epoch approvals hash tree root and wherein the block further comprises epoch approval. In some embodiments, a computer-readable storage medium storing a block approval is provided. The block approval includes a signed candidate block header hash.

In some embodiments, a computer-readable storage medium storing a block approval list is provided. The block approval list includes a block approval list header that includes a block approval stake, a candidate block header hash, and a block approvals hash tree root. The block approval list includes block approvals. In some embodiments, the computer-readable storage medium stores an epoch approval is provided. The epoch approval includes a slot identifier and a signed block header hash.

In some embodiments, a method performed by a computing system is provided for creating a candidate block by a participant in a blockchain network. The method includes executing a creator selection function to generate an indication of whether the participant is authorized to be a creating participant of the candidate block. The method includes, when the indication indicates that the participant is authorized, adding to the candidate block a block header, adding to the candidate block transactions; and adding to the candidate block previous block approvals. The block header includes a unit group identifier owned by the participant, a previous block header hash of a previous block, a transactions hash tree root of a hash tree of transactions, and a previous block approval hash tree root of a hash tree of previous block approvals. The method includes broadcasting the block to participants in the blockchain network.

In some embodiments, one or more computing systems are provided for determining whether consensus has been achieved for adding a block to a blockchain. The one or more computing systems includes one or more computer-readable storage mediums for storing computer-executable instructions and one or more processors for executing the computer-executable instructions stored in the one or more computer-readable storage mediums. The instructions control the one or more computing systems to receive a candidate block to add to the blockchain. The candidate block is created by and broadcasted by a creating participant. The instructions control the one or more computing systems to receive block approvals for the candidate block, each block approval provided by an approving participant in the blockchain. The block approvals are broadcasted by the creating participant. The instructions control the one or more computing systems to calculate a total block approval stake that the approving participants have in the blockchain. The instructions control the one or more computing systems to identify a total stake that participants have in the distributed ledger. The instructions control the one or more computing systems to, when the total block approval stake is at least a threshold fraction of the total skate, indicate that consensus has been achieved for adding the candidate block to the blockchain. In some embodiments, the instructions further control the one or more computing systems to include the block approvals in a subsequent candidate block that is received after the candidate block. In some embodiments, the instructions further control the one or more computing systems to validate the candidate block and each block approval and to suppress the indicating of the consensus when the candidate block or a block approval is not valid. In some embodiments, the instructions further control the one or more computing systems to validate the candidate block and when the validating indicates that the candidate block is valid, send to the creating participant a block approval for the candidate block. In some embodiments, the instructions further control the one or more computing systems to broadcast an epoch approval based on the candidate block. In some embodiments, the instructions further control the one or more computing systems to receive from a creating participant a candidate block and an epoch approval and validate that candidate block and the epoch approval and when valid, add that candidate block to the blockchain.

In some embodiments, one or more computing systems are provided for a creating participant to propose a candidate block to add to a blockchain. The one or more computing systems comprising one or more computer-readable storage mediums for storing computer-executable instructions and one or more processors for executing the computer-executable instructions stored in the one or more computer-readable storage mediums. The instructions control the one or more computing systems to create a candidate block to add to the blockchain, the candidate block including transactions. The instructions control the one or more computing systems to broadcast to participants of the blockchain the candidate block. The instructions control the one or more computing systems to receive from approving participants of the block approvals for the candidate block. The instructions control the one or more computing systems to calculate a total block approval stake that the approving participants have in the blockchain. The instructions control the one or more computing systems to identify a total stake that participants have in the blockchain. The instructions control the one or more computing systems to when the total block approval stake satisfies a threshold portion of the total stake, broadcast to participants the block approval.

In some embodiments, one or more computing systems are provided for transferring assets of a participant from an originating subchain of a blockchain to multiple category subchains of the blockchain. The one or more computing systems comprising one or more computer-readable storage mediums for storing computer-executable instructions and one or more processors for executing the computer-executable instructions stored in the one or more computer-readable storage mediums. The instructions control the one or more computing systems to receive a divide transaction to divide the originating subchain into multiple subchains, each subchain having a category. The instructions control the one or more computing systems to identify a target category. The instructions control the one or more computing systems to broadcast a send transaction for recording in the originating subchain. The send transaction is for transferring assets of the participant from the originating subchain to a target subchain for the target category. The instructions control the one or more computing systems to broadcast transactions that specify the target category for recording in the target subchain.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for creating a candidate block by a participant in a blockchain network, the method comprising:
   executing a creator selection function to generate an indication of whether the participant is authorized to be a creating participant of the candidate block;
   in response to the indication indicating that the participant is authorized,
      adding to the candidate block a block header that includes:
         a unit group identifier owned by the participant;
         a previous block header hash of a previous block;
         a transactions hash tree root of a hash tree of transactions; and
         a previous block approval hash tree root of a hash tree of previous block approvals;
      adding to transactions of the candidate block; and
      adding to previous block approvals of the candidate block; and
   broadcasting the candidate block to participants in the blockchain network.

2. The method of claim 1, wherein the block header further includes an epoch approval hash tree root, and wherein the candidate block further includes an epoch approval.

3. The method of claim 1, further comprising:
   storing an epoch approval, wherein the epoch approval includes a slot identifier and a signed block header hash.

4. The method of claim 1, wherein the creator selection function is based on a portion of a total stake, a total approval stake of a prior block, an identifier associated with the participant, a total number of participants, and a time identifier.

5. The method of claim 4, wherein a portion of the total stake is based on a total number of unit groups, the identifier is an identifier of a unit group owned by the participant, and the time identifier is a slot identifier.

6. The method of claim 1, further comprising:
   receiving block approvals for the candidate block, wherein a block approval list includes valid block approvals, wherein the block approval list comprises:
      a block approval list header that includes:

a block approval stake that satisfies a block approval stake criterion;
a candidate block header hash; and
a block approvals hash tree root; and
block approvals.

7. The method of claim 6,
wherein the block approval stake is a sum of stakes of approving participants who sent a block approval of the block approval list, and
wherein the block approval stake criterion is a threshold fraction of a total stake of the participants.

8. The method of claim 1, wherein the candidate block includes a transaction that inputs a predefined number of units and creates a unit group from the predefined number of units, the unit group having a group identifier.

9. The method of claim 1, wherein the candidate block includes a transaction that destroys a unit group and outputs units of the unit group.

10. The method of claim 1, wherein the candidate block includes previous block approvals for a previous candidate block and one or more transactions that allocate a creator stake to the creating participant of the previous candidate block and an approver stake to each approving participant of a previous approval.

11. A system comprising:
one or more processors; and
one or more memories storing instructions that, when executed by the one or more processors, cause the system to perform a process for creating a candidate block by a participant in a blockchain network, the process comprising:
executing a creator selection function to generate an indication of whether the participant is authorized to be a creating participant of the candidate block;
in response to the indication indicating that the participant is authorized,
adding to the candidate block a block header that includes:
a unit group identifier owned by the participant;
a previous block header hash of a previous block;
a transactions hash tree root of a hash tree of transactions; and
a previous block approval hash tree root of a hash tree of previous block approvals;
adding to transactions of the candidate block; and
adding to previous block approvals of the candidate block; and
broadcasting the candidate block to participants in the blockchain network.

12. The system according to claim 11, wherein the block header further includes an epoch approval hash tree root, and wherein the candidate block further includes an epoch approval.

13. The system according to claim 11, wherein the process further comprises:
storing an epoch approval, wherein the epoch approval includes a slot identifier and a signed block header hash.

14. The system according to claim 11, wherein the creator selection function is based on a portion of a total stake, a total approval stake of a prior block, an identifier associated with the participant, a total number of participants, and a time identifier.

15. The system according to claim 14, wherein a portion of the total stake is based on a total number of unit groups, the identifier is an identifier of a unit group owned by the participant, and the time identifier is a slot identifier.

16. The system according to claim 11, wherein the process further comprises:
receiving block approvals for the candidate block, wherein a block approval list includes valid block approvals, wherein the block approval list comprises:
a block approval list header that includes:
a block approval stake that satisfies a block approval stake criterion;
a candidate block header hash; and
a block approvals hash tree root; and
block approvals.

17. The system according to claim 16,
wherein the block approval stake is a sum of stakes of approving participants who sent a block approval of the block approval list, and
wherein the block approval stake criterion is a threshold fraction of a total stake of the participants.

18. The system according to claim 11, wherein the candidate block includes a transaction that inputs a predefined number of units and creates a unit group from the predefined number of units, the unit group having a group identifier.

19. The system according to claim 11,
wherein the candidate block includes a transaction that destroys a unit group and outputs units of the unit group, and
wherein the candidate block includes previous block approvals for a previous candidate block and one or more transactions that allocate a creator stake to the creating participant of the previous candidate block and an approver stake to each approving participant of a previous approval.

20. A non-transitory computer-readable medium storing instructions that, when executed by a computing system, cause the computing system to perform operations for creating a candidate block by a participant in a blockchain network, the operations comprising:
executing a creator selection function to generate an indication of whether the participant is authorized to be a creating participant of the candidate block;
in response to the indication indicating that the participant is authorized,
adding to the candidate block a block header that includes:
a unit group identifier owned by the participant;
a previous block header hash of a previous block;
a transactions hash tree root of a hash tree of transactions; and
a previous block approval hash tree root of a hash tree of previous block approvals;
adding to transactions of the candidate block; and
adding to previous block approvals of the candidate block; and
broadcasting the candidate block to participants in the blockchain network.

* * * * *